US012205759B2

(12) United States Patent
Matsuda et al.

(10) Patent No.: US 12,205,759 B2
(45) Date of Patent: *Jan. 21, 2025

(54) MAGNETIC COUPLING COIL COMPONENT

(71) Applicant: TAIYO YUDEN CO., LTD., Tokyo (JP)

(72) Inventors: Akihisa Matsuda, Tokyo (JP); Daisuke Yamaguchi, Tokyo (JP); Takayuki Arai, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 165 days.

This patent is subject to a terminal disclaimer.

(21) Appl. No.: 17/565,202

(22) Filed: Dec. 29, 2021

(65) Prior Publication Data

US 2022/0122766 A1 Apr. 21, 2022

Related U.S. Application Data

(63) Continuation of application No. 16/141,122, filed on Sep. 25, 2018, now Pat. No. 11,217,384.

(30) Foreign Application Priority Data

Sep. 29, 2017 (JP) ................................ 2017-190934

(51) Int. Cl.

*H01F 27/32* (2006.01)
*H01F 17/00* (2006.01)
(Continued)

(52) U.S. Cl.

CPC ....... *H01F 27/323* (2013.01); *H01F 17/0013* (2013.01); *H01F 27/2804* (2013.01); (Continued)

(58) Field of Classification Search

CPC ............... H01F 27/323; H01F 17/0013; H01F 27/2804; H01F 27/29; H01F 27/32; (Continued)

(56) References Cited

U.S. PATENT DOCUMENTS 5,602,517 A * 2/1997 Kaneko ............... H01F 17/0013 336/200
6,198,374 B1 3/2001 Abel
(Continued)

FOREIGN PATENT DOCUMENTS

JP H11-297543 A 10/1999
JP 2016-131208 A 7/2016
WO 2017/159284 A1 9/2017

OTHER PUBLICATIONS

Notice of Reasons for Refusal dated Aug. 3, 2021, issued in corresponding Japanese Patent Application No. 2017-190934 with English translation.

*Primary Examiner* — Mang Tin Bik Lian
(74) *Attorney, Agent, or Firm* — Pillsbury Winthrop Shaw Pittman, LLP

(57) ABSTRACT

A coil component according to one embodiment of the present invention includes: a first insulator body containing first magnetic metal particles; a second insulator body containing second magnetic metal particles; a first coil conductor provided in the first insulator body and wound around a coil axis for N1 turns such that intervals between adjacent turns are g1; and a second coil conductor provided in the second insulator body and wound around the coil axis for N2 turns such that intervals between adjacent turns are g2. In the embodiment, a first coil surface of the first coil conductor faces a second coil surface of the second coil conductor, and a distance T between the first coil surface and the second coil surface satisfies a relationship $T \geq g1 \times N1 + g2 \times N2$.

12 Claims, 12 Drawing Sheets

(51) Int. Cl.
*H01F 27/28* (2006.01)
*H01F 27/29* (2006.01)
*H01F 41/04* (2006.01)
*H01F 41/12* (2006.01)
*H01F 17/04* (2006.01)

(52) U.S. Cl.
CPC ............. *H01F 27/29* (2013.01); *H01F 27/32* (2013.01); *H01F 41/041* (2013.01); *H01F 41/122* (2013.01); *H01F 17/04* (2013.01); *H01F 2027/2809* (2013.01); *H01F 27/292* (2013.01)

(58) Field of Classification Search
CPC ...... H01F 41/041; H01F 41/122; H01F 17/04; H01F 27/292; H01F 2027/2809; H01F 17/0006; H01F 27/255; H01F 27/28; H01F 2017/0066; H01F 2017/0073; H01F 2017/0093; H01F 2017/048
See application file for complete search history.

(56) References Cited

U.S. PATENT DOCUMENTS

| | | | | |
|---|---|---|---|---|
| 6,476,690 | B1 | 11/2002 | Nakata | |
| 6,803,839 | B2 | 10/2004 | Azuma | |
| 10,319,511 | B2 * | 6/2019 | Kim | H01F 1/0306 |
| 11,217,384 | B2 * | 1/2022 | Matsuda | H01F 17/0013 |
| 2003/0214793 | A1 | 11/2003 | Uchida | |
| 2006/0014303 | A1 | 1/2006 | Takazawa | |
| 2014/0176282 | A1 | 6/2014 | Jung | |
| 2015/0287515 | A1 * | 10/2015 | Choi | H01F 27/292 336/200 |
| 2015/0302980 | A1 | 10/2015 | Noma | |
| 2016/0078997 | A1 * | 3/2016 | Son | H01F 17/0013 174/260 |
| 2016/0217917 | A1 * | 7/2016 | Jeong | H01F 27/292 |
| 2017/0006706 | A1 * | 1/2017 | Yoon | H01F 17/0033 |
| 2017/0196091 | A1 * | 7/2017 | Lee | H01F 27/292 |
| 2018/0061552 | A1 | 3/2018 | Yang | |
| 2018/0061561 | A1 * | 3/2018 | Sim | H01F 17/04 |
| 2018/0240586 | A1 * | 8/2018 | Yoon | H01F 27/292 |

* cited by examiner

MAGNETIC COUPLING COIL COMPONENT

CROSS-REFERENCE TO RELATED APPLICATIONS

This application is a Continuation application of U.S. patent application Ser. No. 16/141,122, filed on Sep. 25, 2018, which is based on and claims the benefit of priority from Japanese Patent Application Serial No. 2017-190934, filed on Sep. 29, 2017, the contents of each of which are hereby incorporated by reference in their entirety.

TECHNICAL FIELD

The present disclosure relates to a magnetic coupling coil component.

BACKGROUND

A magnetic coupling coil component is an electronic component including a pair of coil units magnetically coupled to each other. Representative examples of magnetic coupling coil component include a common mode choke coil, a transformer, and a coupling inductor. Such a magnetic coupling coil component preferably has a high coupling coefficient between the pair of coil conductors.

A magnetic coupling coil component is produced by, for example, a lamination process. A magnetic coupling coil component produced by a lamination process is disclosed in Japanese Patent Application Publication No. 2016-131208. The coupling coil component disclosed in this publication includes a pair of coil units each having a coil conductor in an insulator body, and the pair of coil units are magnetically coupled to each other.

The pair of coil units are configured such that coil axes of the coil conductors of the coil units are substantially aligned with each other and the coil units are tightly contacted with each other, thereby increasing the degree of coupling between the coil conductors. The insulator body is formed by preparing a plurality of insulating sheets formed of an insulating material having an excellent insulating quality and then stacking the plurality of insulating sheets together. In many cases, the insulating material used for the insulator body is formed of ferrite.

SUMMARY

One object of the present invention is to provide a novel magnetic coupling coil component having an improved degree of coupling between the coil conductors. Other objects of the present invention will be apparent with reference to the entire description in this specification.

A coil component according to one embodiment of the present invention includes: a first insulator body containing first magnetic metal particles, a second insulator body containing second magnetic metal particles, the second insulator body being in direct contact with the first insulator body; a first coil conductor provided in the first insulator body and wound around a coil axis for N1 turns such that intervals between adjacent turns are g1; a second coil conductor provided in the second insulator body and wound around the coil axis for N2 turns such that intervals between adjacent turns are g2. In one embodiment, a first coil surface of the first coil conductor faces a second coil surface of the second coil conductor, and a distance T between the first coil surface and the second coil surface satisfies a relationship $T \geq g1 \times N1 + g2 \times N2$.

According to the embodiment, the first insulator body contains the first filler particles at least partially having electrical conductivity, and therefore, the first insulator body has a higher magnetic permeability than a conventional insulator body formed of ferrite and not containing electrically conductive filler particles. According to the embodiment, the second insulator body contains the second filler particles at least partially having electrical conductivity, and therefore, the second insulator body has a higher magnetic permeability than a conventional insulator body formed of ferrite and not containing electrically conductive filler particles. Accordingly, according to the above embodiment, the coil component in which the first coil conductor provided in the first insulator body and the second coil conductor provided in the second insulator body are coupled magnetically can have a higher coupling coefficient than a conventional coil component in which an insulator body does not contain electrically conductive filler particles.

In one embodiment of the present invention, the first insulator body has a volume resistivity ρ1. The volume resistivity ρ1 has such a value that no dielectric breakdown occurs between adjacent turns of the first coil conductor when the intervals between the adjacent turns of the first coil conductor are g1 or larger. When a voltage V1 is applied across the first coil conductor, a voltage of V1/N1 is applied between adjacent turns of the first coil conductor. The electrical resistance between adjacent turns of the first coil conductor is $\rho 1 \times g1$. Therefore, the first insulator body is configured such that no dielectric breakdown occurs when a voltage of V1/N1 is applied between adjacent turns of the first coil conductor. That is, the withstanding voltage of the first insulator body is V1/N1 or higher between adjacent turns of the first coil conductor (at intervals of g1). Accordingly, when a voltage V1 is applied between the first coil conductor and a conductor positioned in the first insulator body so as to be distant from the first coil conductor by $g1 \times N1$ or more, no dielectric breakdown occurs between this conductor and the first coil conductor in the first insulator body. In other words, insulation can be ensured between the first coil conductor and the conductor positioned in the first insulator body so as to be distant from the first coil conductor by $g1 \times N1$ or more.

In one embodiment of the present invention, the second insulator body has a volume resistivity ρ2. The volume resistivity ρ2 has such a value that no dielectric breakdown occurs between adjacent turns of the second coil conductor when the intervals between the adjacent turns of the second coil conductor are g2 or larger. When a voltage V2 is applied across the second coil conductor, a voltage of V2/N2 is applied between adjacent turns of the second coil conductor. The electrical resistance between adjacent turns of the second coil conductor is $\rho 2 \times g2$. Therefore, the second insulator body is configured such that no dielectric breakdown occurs when a voltage of V2/N2 is applied between adjacent turns of the second coil conductor. That is, the withstanding voltage of the second insulator body is V2/N2 or higher between adjacent turns of the second coil conductor. Accordingly, when a voltage V2 is applied between the second coil conductor and a conductor positioned in the second insulator body so as to be distant from the second coil conductor by $g2 \times N2$ or more, no dielectric breakdown occurs in the second insulator body. In other words, insulation can be ensured between the second coil conductor and the conductor positioned in the second insulator body so as to be distant from the second coil conductor by $g2 \times N2$ or more.

As described above, in the first insulator body, insulation can be ensured at a position distant from the first coil conductor by g1×N1 or more, and in the second insulator body, insulation can be ensured at a position distant from the second coil conductor by g2×N2 or more. Therefore, dielectric breakdown between the first coil surface and the second coil surface can be prevented when the distance T between the first coil surface and the second coil surface satisfies the relationship T≥g1×N1+g2×N2.

In one embodiment of the present invention, the first insulator body has a volume resistivity of $1\times10^7$ Ω·cm or lower. In one embodiment of the present invention, the second insulator body has a volume resistivity of $1\times10^7$ Ω·cm or lower.

In one embodiment of the present invention, the distance T between the first coil surface and the second coil surface satisfies the relationship 2×(g1×N1+g2×N2)≥T≥g1×N1+g2×N2. A large distance between the first coil surface and the second coil surface ensures the insulation but also degrades the coupling coefficient therebetween. When the upper limit of the distance T between the first coil surface and the second coil surface is 2×(g1×N1+g2×N2), it is possible to ensure the insulation and inhibit the coupling coefficient from being degraded.

A coil component according to one embodiment of the present invention further includes: a first external electrode electrically connected to one end of the first coil conductor; and a second external electrode electrically connected to another end of the first coil conductor, wherein a distance M1 between the first coil conductor and the first external electrode satisfies a relationship M1≥g1×N1, and a distance M2 between the first coil conductor and the second external electrode satisfies a relationship M2≥g1×N1.

In the embodiment, it is possible to prevent dielectric breakdown between the first coil conductor and the first external electrode to which the first coil conductor is connected.

A coil component according to one embodiment of the present invention further includes: a third external electrode electrically connected to one end of the second coil conductor; and a fourth external electrode electrically connected to another end of the second coil conductor, wherein a distance M3 between the second coil conductor and the third external electrode satisfies a relationship M3≥g2×N2, and a distance M4 between the second coil conductor and the fourth external electrode satisfies a relationship M4≥g2×N2.

In the embodiment, it is possible to prevent dielectric breakdown between the second coil conductor and the second external electrode to which the second coil conductor is connected.

In a coil component according to one embodiment of the present invention, the first coil conductor is connected to the first external electrode via a first via conductor, and a distance M5 between the first coil conductor and the first via conductor satisfies a relationship M5≥g1×N1+g2×N2.

In the embodiment, it is possible to prevent dielectric breakdown between the first coil conductor and the first via conductor.

In a coil component according to one embodiment of the present invention, the first coil conductor is connected to the second external electrode via a second via conductor, and a distance M6 between the first coil conductor and the second via conductor satisfies a relationship M6≥g1×N1.

In the embodiment, it is possible to prevent dielectric breakdown between the first coil conductor and the second via conductor.

In a coil component according to one embodiment of the present invention, the second coil conductor is connected to the third external electrode via a third via conductor, and the second coil conductor is connected to the fourth external electrode via a fourth via conductor, and a distance M7 between the second coil conductor and the fourth via conductor satisfies a relationship M7≥g2×N2.

In the embodiment, it is possible to prevent dielectric breakdown between the second coil conductor and the fourth via conductor.

A coil component according to another embodiment of the present invention includes: a first insulator body containing first magnetic metal particles; a second insulator body containing second magnetic metal particles; a first coil conductor provided in the first insulator body and wound around a coil axis for N1 turns such that intervals between adjacent turns are g1; a second coil conductor provided in the second insulator body and wound around the coil axis for N2 turns such that intervals between adjacent turns are g2; a first external electrode electrically connected to one end of the first coil conductor; a second external electrode electrically connected to another end of the first coil conductor; a third external electrode electrically connected to one end of the second coil conductor; and a fourth external electrode electrically connected to another end of the second coil conductor. In the embodiment, a distance M1 between the first coil conductor and the first external electrode satisfies a relationship M1≥g1×N1, a distance M2 between the first coil conductor and the second external electrode satisfies a relationship M2≥g1×N1, a distance M3 between the second coil conductor and the third external electrode satisfies a relationship M3≥g2×N2, and a distance M4 between the second coil conductor and the fourth external electrode satisfies a relationship M4≥g2×N2.

In the embodiment, it is possible to prevent dielectric breakdown between the first coil conductor and the first external electrode to which the first coil conductor is connected and between the second coil conductor and the second external electrode to which the second coil conductor is connected.

A coil component according to another embodiment of the present invention includes: a first insulator body containing first magnetic metal particles; a second insulator body containing second magnetic metal particles; a first coil conductor provided in the first insulator body and wound around a coil axis for N1 turns such that intervals between adjacent turns are g1; a second coil conductor provided in the second insulator body and wound around the coil axis for N2 turns such that intervals between adjacent turns are g2; a first external electrode electrically connected to one end of the first coil conductor; a second external electrode electrically connected to another end of the first coil conductor; a third external electrode electrically connected to one end of the second coil conductor; a fourth external electrode electrically connected to another end of the second coil conductor; a first via conductor electrically connecting between the first coil conductor and the first external electrode; a second via conductor electrically connecting between the first coil conductor and the second external electrode; a third via conductor electrically connecting between the second coil conductor and the third external electrode; and a fourth via conductor electrically connecting between the second coil conductor and the fourth external electrode. In the embodiment, a distance M5 between the second coil conductor and the first via conductor satisfies a relationship M5≥g1×N1+g2×N2, a distance M6 between the first coil conductor and the second via conductor satisfies a relationship M6≥g1×N1, and a distance M7 between the second coil conductor and the fourth via conductor satisfies a relationship M7≥g2×N2.

In the embodiment, it is possible to prevent dielectric breakdown between the second coil conductor and the first via conductor, between the first coil conductor and the second via conductor, between the second coil conductor and the first via conductor, and between the second coil conductor and the fourth via conductor.

Advantages

According to the various embodiments of the invention disclosed herein, a magnetic coupling coil component can have an increased degree of coupling between coil conductors.

DESCRIPTION OF THE EMBODIMENTS

Various embodiments of the invention will be described hereinafter with reference to the drawings. Elements common to a plurality of drawings are denoted by the same reference signs throughout the plurality of drawings. It should be noted that the drawings do not necessarily appear to an accurate scale, for convenience of description.

Figure 1:
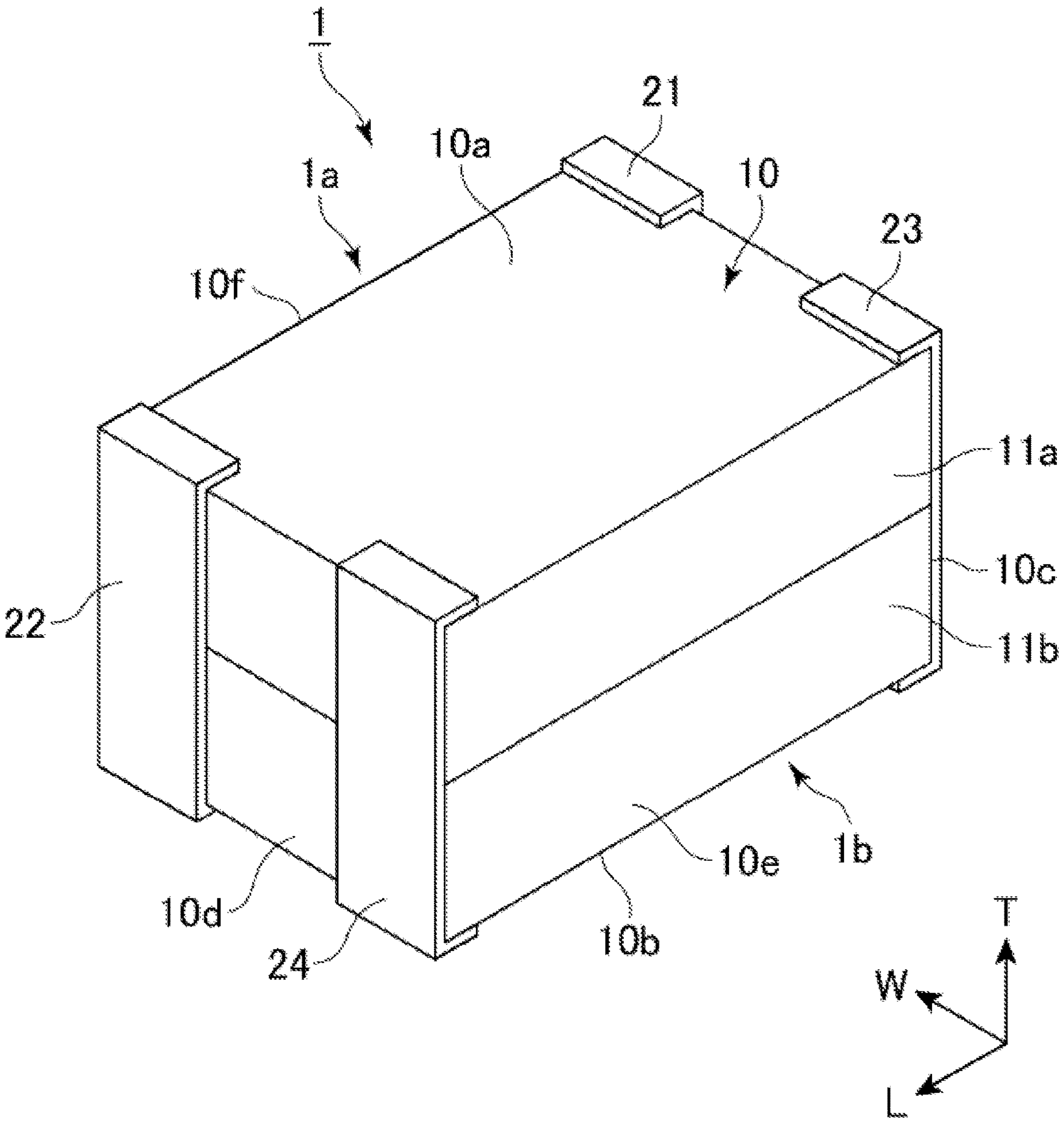
FIG. 1 is a perspective view of a coil component according to one embodiment of the present invention.
Figure 2:
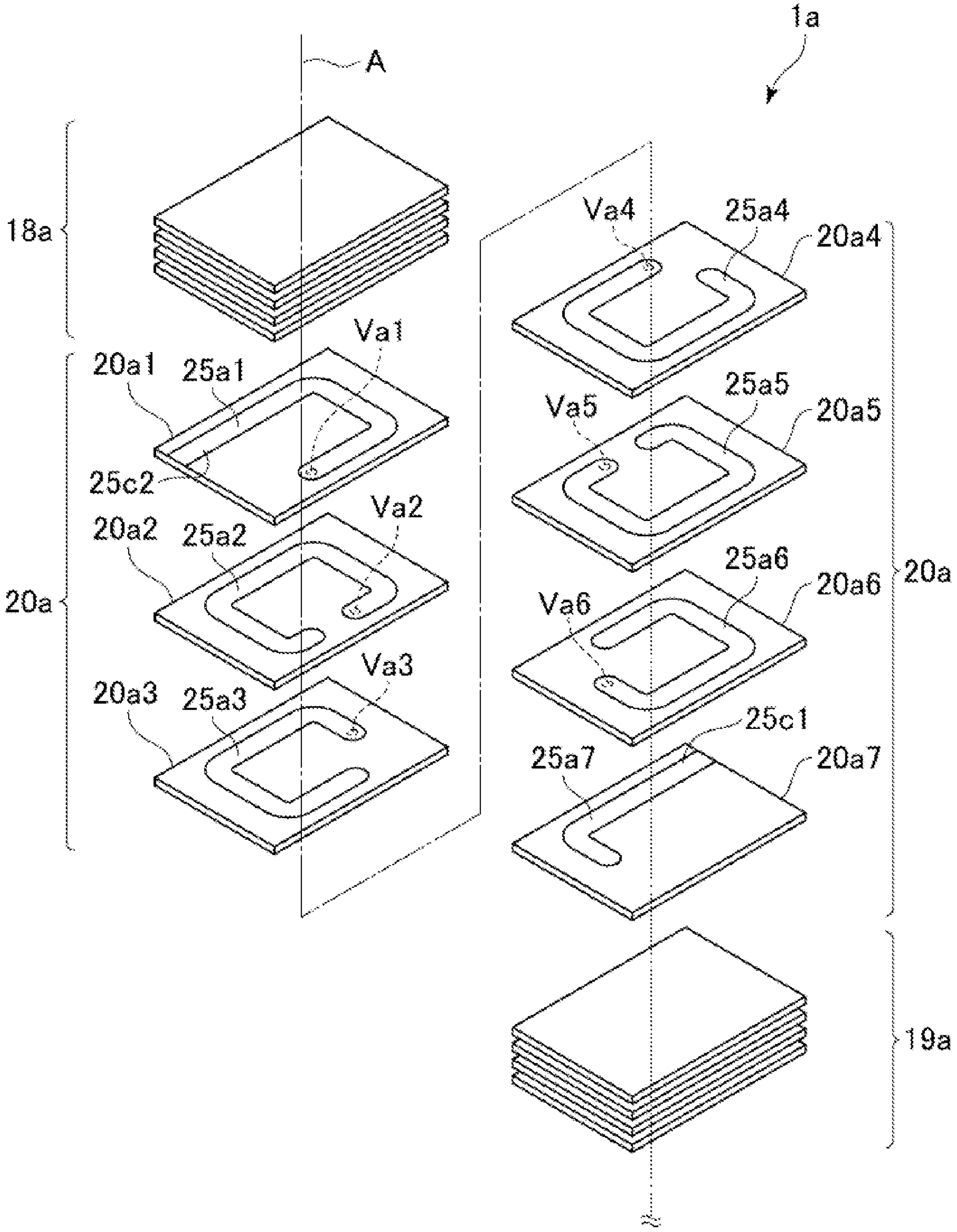
FIG. 2 is an exploded perspective view of one of two coil units included in the coil component of FIG. 1.
Figure 3:
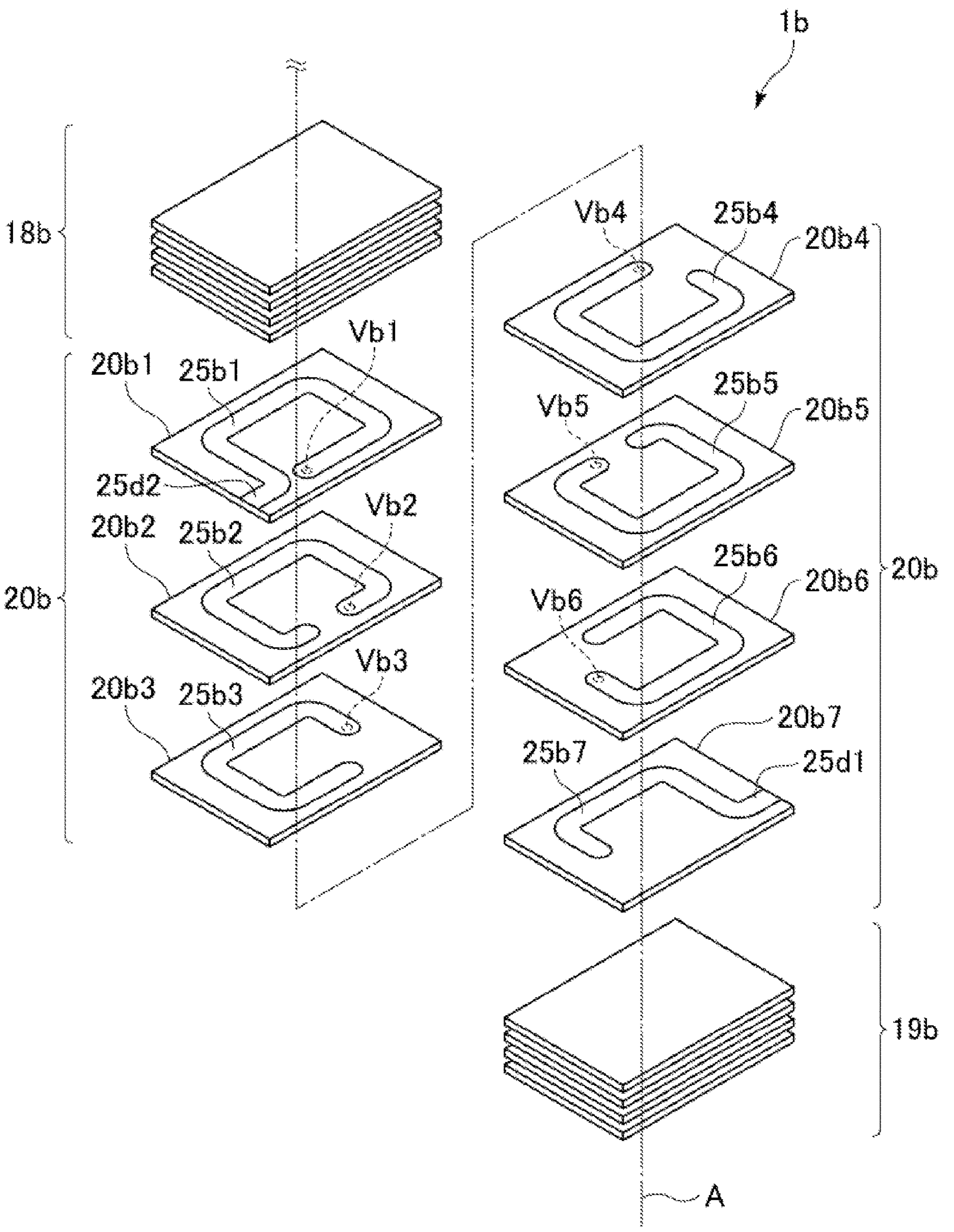
FIG. 3 is an exploded perspective view of the other of the two coil units included in the coil component of FIG. 1.
Figure 4:
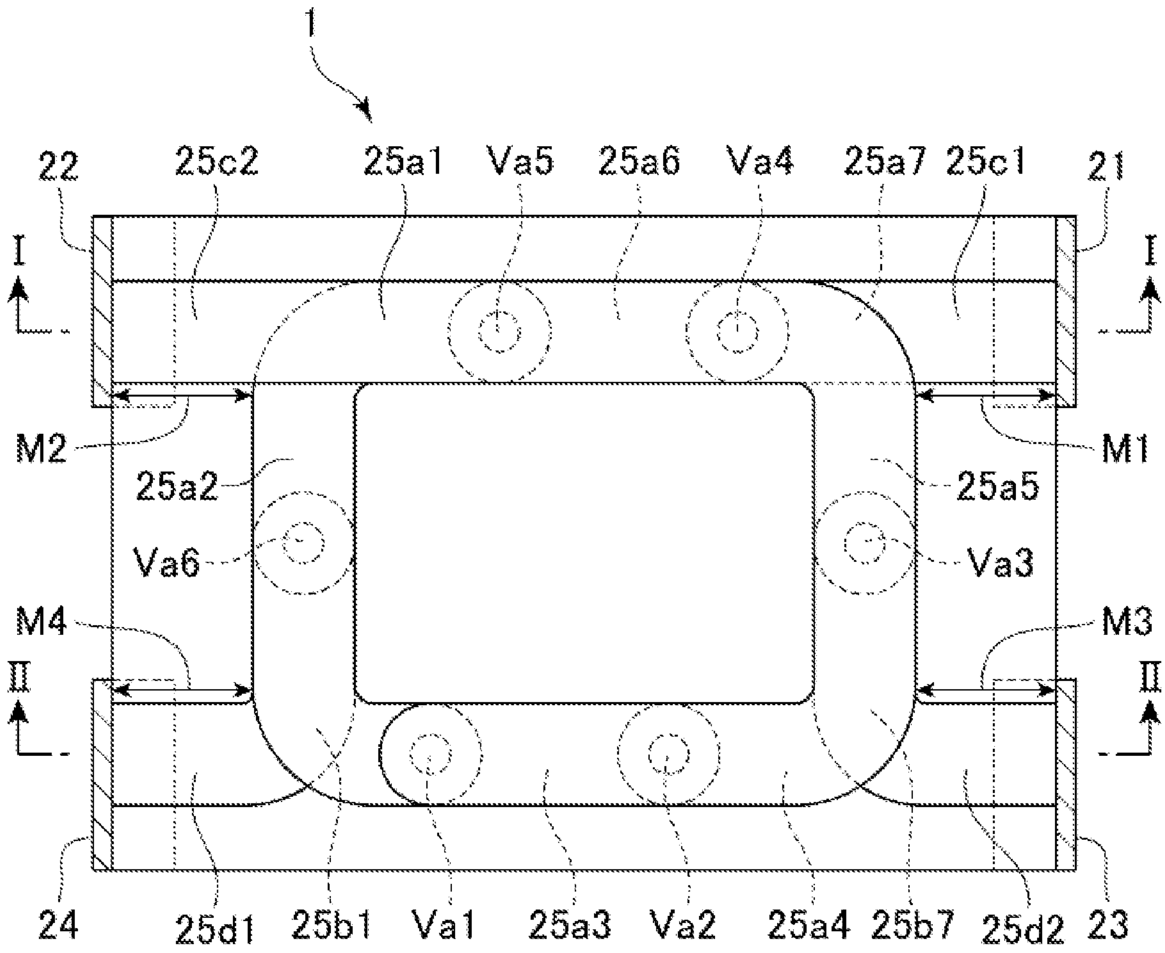
FIG. 4 is a plan view of the coil component shown in FIG. 1.
Figure 5:
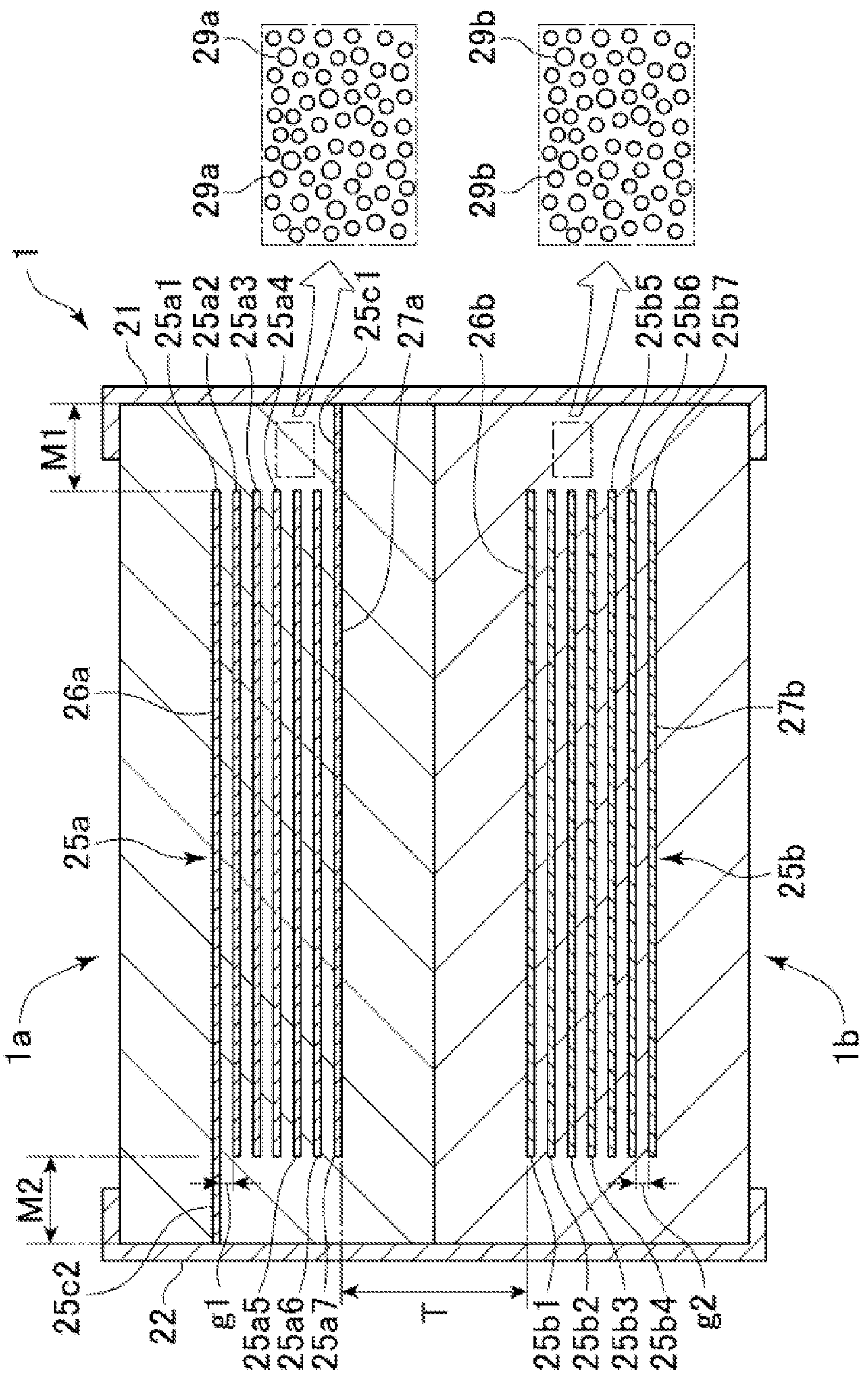
FIG. 5 schematically shows a cross section of the coil component of FIG. 1 cut along the line I-I.
Figure 6:
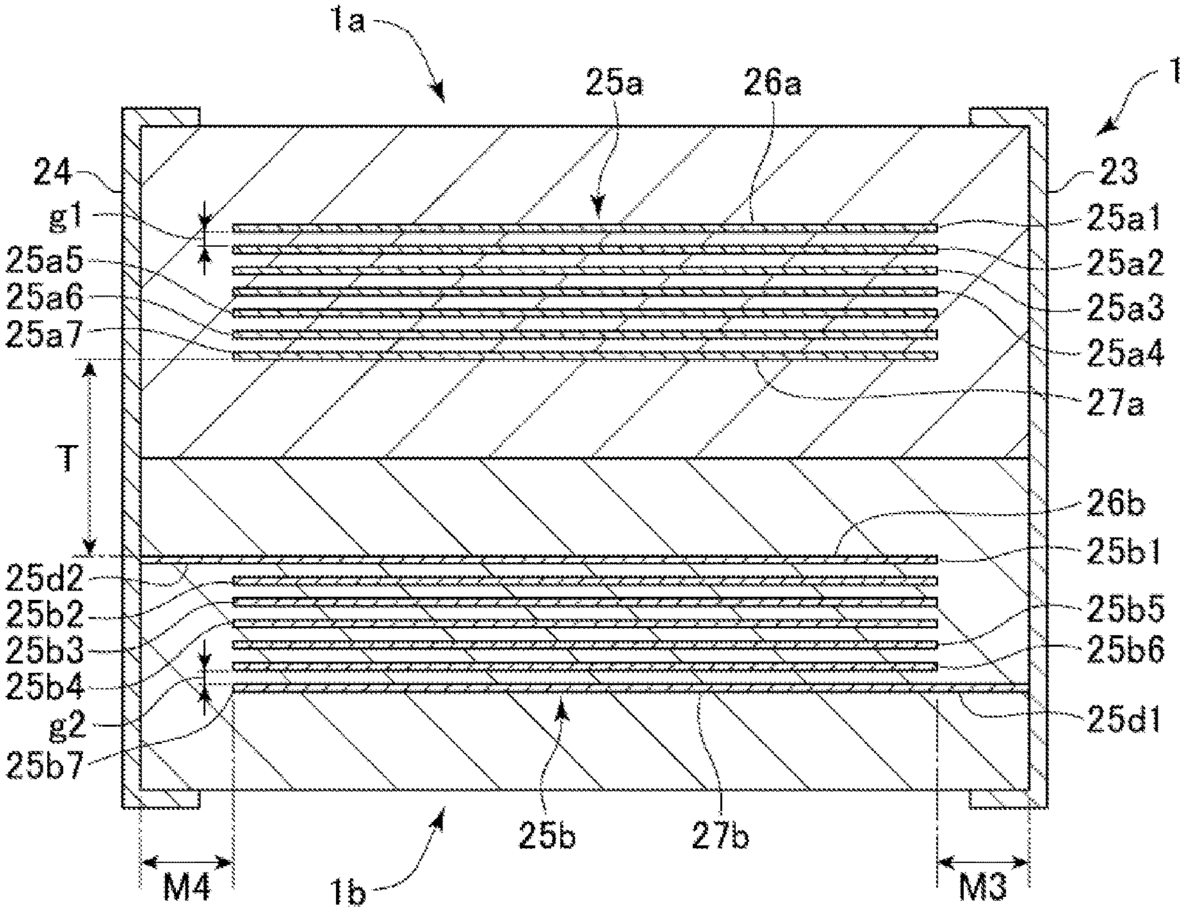
FIG. 6 schematically shows a cross section of the coil component of FIG. 1 cut along the line II-II.

A coil component 1 according to one embodiment of the present invention will be hereinafter described with reference to FIGS. 1 to 6. FIG. 1 is a perspective view of the coil component 1 according to one embodiment of the present invention, FIG. 2 is an exploded perspective view of a coil unit 1*a* included in the coil component 1 of FIG. 1, FIG. 3 is an exploded perspective view of a coil unit 1*b* included in the coil component 1 of FIG. 1, FIG. 4 is a plan view of the coil component 1 of FIG. 1, FIG. 5 schematically shows a cross section of the coil component 1 cut along the line I-I, and FIG. 6 schematically shows a cross section of the coil component 1 cut along the line II-II. In FIG. 4, a top cover layer 18*a* (described later) is omitted for description of the winding pattern of the coil conductors.

These drawings show, as one example of the coil component 1, a common mode choke coil for eliminating common mode noise from a differential transmission circuit that transmits a differential signal. A common mode choke coil is one example of a magnetic coupling coil component to which the present invention is applicable. The present invention can also be applied to a transformer, a coupled inductor, and other various coil components, in addition to a common mode choke coil. A common mode choke coil is produced by, for example, a lamination process or a thin film process.

As shown, the coil component 1 according to one embodiment of the present invention includes the coil unit 1*a*, the coil unit 1*b*, an external electrode 21, an external electrode 22, an external electrode 23, and an external electrode 24.

The coil unit 1*a* includes an insulator body 11*a*, made of a magnetic material having an excellent insulating quality, and a coil conductor 25*a* provided in the insulator body 11*a*. In one embodiment, the insulator body 11*a* has a rectangular parallelepiped shape. One end of the coil conductor 25*a* is electrically connected to the external electrode 21. The other end of the coil conductor 25*a* is electrically connected to the external electrode 22.

The coil unit 1*b* may be configured in the same manner as the coil unit 1*a*. In the embodiment shown, the coil unit 1*b* includes an insulator body 11*b*, made of a magnetic material, and a coil conductor 25*b* provided in the insulator body 11*b*. In one embodiment, the insulator body 11*b* has a rectangular parallelepiped shape. One end of the coil conductor 25*b* is electrically connected to the external electrode 23. The other end of the coil conductor 25*b* is electrically connected to the external electrode 24. The coil conductor 25*a* and the coil conductor 25*b* may have the same shape or may have different shapes. In the embodiment shown, the shape of the coil conductor 25*a* is different from that of the coil conductor 25*b*. When the coil conductor 25*a* and the coil conductor 25*b* have different shapes, the inductance of the coil conductor 25*a* may be different from that of the coil conductor 25*b*.

The bottom surface of the insulator body 11*a* is joined to the top surface of the insulator body 11*b*. An insulator body 10 includes the insulator body 11*a* and the insulator body 11*b* joined to the insulator body 11*a*.

The insulator body 10 (also referred to as "the base 10" or "the insulating base 10") has a first principal surface 10*a*, a second principal surface 10*b*, a first end surface 10*c*, a second end surface 10*d*, a first side surface 10*e*, and a second side surface 10*f*. The outer surface of the insulator body 10 is defined by these six surfaces. The first principal surface 10*a* and the second principal surface 10*b* are opposed to each other, the first end surface 10*c* and the second end surface 10*d* are opposed to each other, and the first side surface 10*e* and the second side surface 10*f* are opposed to each other.

In FIG. 1, the first principal surface 10*a* lies on the top side of the insulator body 10, and therefore, the first principal surface 10*a* may be herein referred to as "the top surface." Similarly, the second principal surface 10*b* may be referred to as "the bottom surface." The coil component 1 is disposed such that the second principal surface 10*b* faces a circuit board (not shown), and therefore, the second principal surface 10*b* may be herein referred to as "the mounting surface." Furthermore, the top-bottom direction of the coil component 1 is based on the top-bottom direction in FIG. 1.

In this specification, the "length" direction, the "width" direction, and the "thickness" direction of the coil component 1 refer to the "L" direction, the "W" direction, and the "T" direction in FIG. 1, respectively, unless otherwise construed from the context.

In one embodiment of the present invention, the coil component 1 has a length (the dimension in the direction of the axis L) of 0.2 to 6.0 mm, a width (the dimension in the direction of the axis W) of 0.1 to 4.5 mm, and a thickness (the dimension in the direction of the axis T) of 0.1 to 4.0 mm. These dimensions are mere examples, and the coil component 1 to which the present invention can be applied can have any dimensions that conform to the purport of the present invention. In one embodiment, the coil component 1 has a low profile. For example, the coil component 1 has a thickness of 0.60 mm or smaller. It is also possible that the coil component 1 has a thickness of 0.55 mm or smaller. For example, the coil component 1 has a width larger than the thickness thereof.

In the embodiment shown, the external electrode 21 and the external electrode 23 are provided on the first end surface 10*c* of the insulator body 10. The external electrode 22 and the external electrode 24 are provided on the second end surface 10*d* of the insulator body 10. Each of the external electrodes are formed and arranged such that a part thereof extends along the first principal surface 10*a* of the insulator body 10. Each of the external electrodes are formed and arranged such that a part thereof extends along the second principal surface 10*b* of the insulator body 10. Each of the external electrode 21 and the external electrode 22 may be formed and arranged such that a part thereof extends along the second side surface 10*f* of the insulator body 10. Each of the external electrode 23 and the external electrode 24 may be formed and arranged such that a part thereof extends along the first side surface 10*e* of the insulator body 10.

The shapes and the arrangements of the external electrodes described explicitly in this specification are mere examples. Therefore, the shapes and the arrangements of the external electrodes that are applicable to the present invention are not limited to those explicitly described in this specification.

As shown in FIG. 2, the insulator body 11*a* includes a coil layer 20*a*, a top cover layer 18*a* provided on the top surface of the coil layer 20*a*, and a bottom cover layer 19*a* provided on the bottom surface of the coil layer 20*a*.

The coil layer 20*a* includes insulating layers 20*a*1 to 20*a*7 stacked together. The insulator body 11*a* includes an insulating layer 20*a*7, an insulating layer 20*a*6, an insulating layer 20*a*5, an insulating layer 20*a*4, an insulating layer 20*a*3, an insulating layer 20*a*2, and an insulating layer 20*a*1 that are stacked in this order from the negative side to the positive side in the direction of the axis T.

As will be described later, the insulating layers 20*a*1 to 20*a*7 have conductive patterns 25*a*1 to 25*a*7 formed thereon, respectively. These conductive patterns 25*a*1 to 25*a*7 and lead-out conductors 25*c*1, 25*c*2 constitute the coil conductor 25*a*. All the conductive patterns 25*a*1 to 25*a*7 are wound around a coil axis A. In the embodiment shown, the coil axis A extends in the direction of the axis T. This extension direction of the coil axis A is the same as the lamination direction of the insulating layers 20*a*1 to 20*a*7.

The coil conductor 25*a* has a top surface 26*a* and a bottom surface 27*a*. The top surface 26*a* is a plain surface extending through the top surface of the conductive pattern 25*a*1. The bottom surface 27*a* is a plain surface extending through the bottom surface of the conductive pattern 25*a*7.

In another embodiment of the present invention, the insulating layers 20*a*1 to 20*a*7 may be stacked together in the direction of the axis L. In this arrangement, the conductive patterns 25*a*1 to 25*a*7 and the lead-out conductors 25*c*1, 25*c*2 are formed on the surfaces of the insulating layers 20*a*1 to 20*a*7, and thus the coil axis A extends in the direction of the axis L, the same as the lamination direction of the insulating layers 20*a*1 to 20*a*7. In still another embodiment of the present invention, the insulating layers 20*a*1 to 20*a*7 may be stacked together in the direction of the axis W. In this arrangement, the conductive patterns 25*a*1 to 25*a*7 and the lead-out conductors 25*c*1, 25*c*2 are formed on the surfaces of the insulating layers 20*a*1 to 20*a*7, and thus the coil axis A extends in the direction of the axis W, the same as the lamination direction of the insulating layers 20*a*1 to 20*a*7.

The conductive pattern 25*a*1 is wound around the coil axis A for a three-fourth turn. Each of the conductive patterns 25*a*2 to 25*a*6 is wound around the coil axis A for a seven-eighth turn. The conductive pattern 25*a*7 is wound around the coil axis A for a one-fourth turn. The conductive pattern 25*a*1 is wound for a smaller number of turns than the conductive patterns 25*a*2 to 25*a*6 because it is connected with the external electrode 22. The conductive pattern 25*a*7 is wound for a smaller number of turns than the conductive patterns 25*a*2 to 25*a*6 because it is connected with the external electrode 21. The numbers of turns of the conductive patterns 25*a*1 to 25*a*7 are not limited to those described herein as examples. In the embodiment shown, the coil conductor 25*a* is wound around the coil axis A for 5.375 ($=3/4+5\times7/8+1/4$) turns. The number of turns of the coil conductor 25*a* is not limited to that described herein as an example. The coil conductor 25*a* is wound around the coil axis A for N1 turns (N1 is a real number equal to or greater than two).

The top cover layer 18*a* is a laminate including a plurality of insulating layers stacked together. Similarly, the bottom cover layer 19*a* is a laminate including a plurality of insulating layers stacked together.

The coil layer 20*a* may include any number of insulating layers as necessary, in addition to the insulating layers 20*a*1 to 20*a*7. A part of the insulating layers 20*a*1 to 20*a*7 may be omitted as necessary.

The top cover layer 18*a*, the bottom cover layer 19*a*, and the insulating layers included in the coil layer 20*a* are formed of a resin material having an excellent insulating quality. Examples of the resin material include a polyvinyl butyral (PVB) resin, an ethyl cellulose resin, a polyvinyl alcohol resin, and an acrylic resin. The resin contained in the top cover layer 18*a*, the bottom cover layer 19*a*, and the coil layer 20*a* may be a thermosetting resin having an excellent insulating quality. Examples of the thermosetting resin include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin. The resin contained in one insulating layer is either the same as or different from the resin contained in another insulating layer.

In one embodiment of the present invention, at least a part of the insulating layers constituting the top cover layer 18*a*, the bottom cover layer 19*a*, and the coil layer 20*a* contains a large number of filler particles 29*a* at least partially having electrical conductivity. A part of the insulating layers constituting the top cover layer 18*a*, the bottom cover layer 19*a*, and the coil layer 20*a* may not contain the filler particles 29*a*.

The filler particles 29*a* are formed of various known electrically conductive materials. For example, the filler particles 29*a* are soft magnetic metal particles. Soft magnetic metal particles applicable to the insulating layers are made of a material in which magnetism is developed in an unoxidized metal portion, and such particles are, for example, particles including unoxidized metal particles or alloy particles. At least a part of the filler particles 29*a* has electrical conductivity. A part of the filler particles 29*a* may be insulating. For example, the filler particles 29*a* may have an insulating film formed on the surface thereof. The insulating film may be, for example, an oxidized film made of an oxidized soft magnetic metal material. Examples of soft magnetic metal particles applicable to the insulating layers include Fe particles made of Fe and inevitable impurities, alloy-based particles such as Fe—Si—Cr particles, Fe—Si—Al particles, and Fe—Ni particles, amorphous alloy particles such as Fe—Si—Cr—B—C particles and Fe—Si—B—Cr particles, and a mixture thereof. Powder compacts made of these particles can also be used as the filler particles 29*a*. These particles or powder compacts having the surface thereof thermally treated to form an oxidized film can also be used as the filler particles 29*a*. In one embodiment, the filler particles 29*a* contain 95 wt % or more Fe. Thus, occurrence of magnetic saturation in the insulator body 11*a* can be inhibited, and as a result, the coil component 1 can have improved direct current (DC) superposition characteristics.

The filler particles 29*a* are produced by the atomization method, for example. The filler particles contained in the insulating layers can also be produced by any known method other than the atomizing method. Commercially available soft magnetic metal particles can be used as the filler particles contained in the insulating layers. Examples of commercially available soft magnetic metal particles include PF-20F from Epson Atmix Corporation and SFR-FeSiAl from Nippon Atomized Metal Powders Corporation.

The filler particles 29*a* contained in the top cover layer 18*a*, the bottom cover layer 19*a*, and/or the coil layer 20*a* may have, for example, a spherical, flat, or foil-like shape. The filler particles 29*a* may have any shape.

The materials and the shapes of the filler particles 29*a* described explicitly in this specification are mere examples. Therefore, the materials and the arrangements of the filler particles 29*a* that are applicable to the present invention are not limited to those explicitly described in this specification.

The insulator body 11*a* has a volume resistivity ρ1. In one embodiment, the insulator body 11*a* has a volume resistivity ρ1 at any part in the interior thereof. It is also possible that the insulator body 11*a* has a uniform volume resistivity. The volume resistivity ρ1 of the insulator body 11*a* has such a value that no dielectric breakdown occurs between adjacent turns of the coil conductor 25*a*. For example, the volume resistivity ρ1 of the insulator body 11*a* is $1\times10^7$ Ω·cm or lower. In one embodiment of the present invention, at least a part of the top cover layer 18*a*, the bottom cover layer 19*a*, and the coil layer 20*a* has a volume resistivity of $1\times10^7$ Ω·cm or lower.

On the top surfaces of the insulating layers 20*a*1 to 20*a*7, there are provided conductive patterns 25*a*1 to 25*a*7, respectively. The conductive patterns 25*a*1 to 25*a*7 are formed by applying a conductive paste made of a metal or alloy having an excellent electrical conductivity by a printing method such as screen printing or any other known method such as plating, etching, etc. The conductive paste may be made of Ag, Pd, Cu, Al, or alloys thereof. The conductive patterns 25*a*1 to 25*a*7 may be formed by other methods using other materials.

The insulating layers 20*a*1 to 20*a*6 are provided with vias Va1 to Va6, respectively, at predetermined positions therein. The vias Va1 to Va6 are formed by drilling through-holes at predetermined positions in the insulating layers 20*a*1 to 20*a*6 so as to extend through the insulating layers 20*a*1 to 20*a*6 in the direction of the axis T and filling the conductive paste into the through-holes.

Each of the conductive patterns 25*a*1 to 25*a*7 is electrically connected to adjacent ones via the vias Va1 to Va6. For example, the conductive pattern 25*a*1 is electrically connected to the conductive pattern 25*a*2, adjacent to the conductive pattern 25*a*1, via the via Va1. The conductive patterns 25*a*1 to 25*a*7 connected in this manner constitute a coil conductor 25*a* having a spiral shape. The coil conductor 25*a* includes the conductive patterns 25*a*1 to 25*a*7 and the vias Va1 to Va6.

The end of the conductive pattern 25*a*1 opposite to the other end connected to the via Va1 is connected to the external electrode 22 via the lead-out conductor 25*c*2. The end of the conductive pattern 25*a*7 opposite to the other end connected to the via Va6 is connected to the external electrode 21 via the lead-out conductor 25*c*1. The lead-out conductor 25*c*1 is formed on the top surface of the insulating layer 20*a*7. The lead-out conductor 25*c*2 is formed on the top surface of the insulating layer 20*a*1. The lead-out conductor 25*c*1 and the lead-out conductor 25*c*2 may be formed of the same electrically conductive material as the conductive patterns 25*a*1 to 25*a*7.

Next, the coil unit 1*b* will be described. The coil unit 1*b* is shown in most detail in FIG. 3. As described above, the coil unit 1*b* may be configured in the same manner as the coil unit 1*a*.

The insulator body 11*b* includes a coil layer 20*b*, a top cover layer 18*b* provided on the top surface of the coil layer 20*b*, and a bottom cover layer 19*b* provided on the bottom surface of the coil layer 20*b*. The coil layer 20*b* is configured in the same manner as the coil layer 20*a*. More specifically, the coil layer 20*b* includes insulating layers 20*b*1 to 20*b*7 stacked together. The insulating layers 20*b*1 to 20*b*7 are configured in the same manner as the insulting layers 20*a*1 to 20*a*7.

The bottom cover layer 19*b* is configured in the same manner as the top cover layer 18*a*. More specifically, the bottom cover layer 19*b* is a laminate including a plurality of insulating layers stacked together. The top cover layer 18*b* is configured in the same manner as the bottom cover layer 19*a*. More specifically, the top cover layer 18*b* is a laminate including a plurality of insulating layers stacked together.

The insulating layers constituting the top cover layer 18*b*, the bottom cover layer 19*b*, and the coil layer 20*b* are formed of a resin material having an excellent insulating quality, as are the insulating layers constituting the top cover layer 18*a*, the bottom cover layer 19*a*, and the coil layer 20*a*. At least a part of the insulating layers constituting the top cover layer 18*b*, the bottom cover layer 19*b*, and the coil layer 20*b* contains a large number of filler particles 29*b* at least partially having electrical conductivity. The filler particles 29*b* are disposed in the insulating layers in the same manner as the filler particles 29*a*. The description on the filler particles 29*a* also applies to the filler particles 29*b*. That is, at least a part of the filler particles 29*b* has electrical conductivity. A part of the filler particles 29*b* may be insulating.

The insulator body 11*b* has a volume resistivity ρ2. In one embodiment, the insulator body 11*b* has a volume resistivity ρ2 at any part in the interior thereof. It is also possible that the insulator body 11*b* has a uniform volume resistivity. The volume resistivity ρ2 of the insulator body 11*b* has such a value that no dielectric breakdown occurs between adjacent turns of the coil conductor 25*b*. The volume resistivity ρ2 of the insulator body 11*b* is either the same as or different from the volume resistivity ρ1 of the insulator body 11*a*. For example, the volume resistivity ρ2 of the insulator body 11*b* is $1\times10^7$ Ω·cm or lower. In one embodiment of the present invention, at least a part of the top cover layer 18*b*, the bottom cover layer 19*b*, and the coil layer 20*b* has a volume resistivity of $1\times10^7$ Ω·cm or lower.

In the embodiment shown, the coil conductor 25*b* includes conductive patterns 25*b*1 to 25*b*7. Each of the conductive patterns 25*b*1 to 25*b*7 is formed on the top surface of the corresponding one of the insulating layers 20*b*1 to 20*b*7. Each of the conductive patterns 25*b*1 to 25*b*7 is electrically connected to adjacent ones via the vias Vb1 to Vb6. For example, the conductive pattern 25*b*1 is connected to the conductive pattern 25*b*2 via the via Vb1. The end of the conductive pattern 25*b*1 opposite to the other end connected to the via Vb1 is connected to the external electrode 24 via the lead-out conductor 25*d*2. The end of the conductive pattern 25*b*7 opposite to the other end connected to the via Vb6 is connected to the external electrode 23 via the lead-out conductor 25*d*1. The lead-out conductor 25*d*1 is formed on the top surface of the insulating layer 20*b*7. The lead-out conductor 25*d*2 is formed on the top surface of the insulating layer 20*b*1. The lead-out conductor 25*d*1 and the lead-out conductor 25*d*2 may be formed of the same electrically conductive material as the conductive patterns 25*b*1 to 25*b*7.

These conductive patterns 25*b*1 to 25*b*7 constitute the coil conductor 25*b*. All the conductive patterns 25*b*1 to 25*b*7 are wound around a coil axis A. The extension direction of the coil axis A is the same as the lamination direction of the insulating layers 20*b*1 to 20*b*7.

The coil conductor 25*b* has a top surface 26*b* and a bottom surface 27*b*. The top surface 26*b* is a plain surface extending through the top surface of the conductive pattern 25*b*1. The bottom surface 27*b* is a plain surface extending through the bottom surface of the conductive pattern 25*b*7.

Each of the conductive patterns 25*b*1 to 25*b*6 is wound around the coil axis A for a seven-eighth turn. The conductive pattern 25*b*7 is wound for a smaller number of turns than the other conductive patterns because it is connected with the external electrode 23. The numbers of turns of the conductive patterns 25*b*1 to 25*b*7 are not limited to those described herein as examples. In the embodiment shown, the conductive pattern 25*b*7 is wound around the coil axis A for a half turn. Therefore, in the embodiment shown, the coil conductor 25*b* is wound around the coil axis A for 5.75 ($=6\times7/8+0.5$) turns. The number of turns of the coil conductor 25*b* is not limited to that described herein as an example. The coil conductor 25*b* is wound around the coil axis A for N2 turns (N2 is a real number equal to or greater than two).

Each of the constituents of the coil unit 1*b* is formed of the same material by the same method as the corresponding one of the constituents of the coil unit 1*a*. Therefore, those skilled in the art can grasp the materials and the production methods of the constituents of the coil unit 1*b* by referring to the description related to the constituents of the coil unit 1*a*.

The coil unit 1*a* is joined to the coil unit 1*b*. In one embodiment of the present invention, the coil unit 1*a* is disposed such that the bottom surface thereof is in contact with the top surface of the coil unit 1*b*. Therefore, in the embodiment shown, the bottom surface 27*a* of the coil conductor 25*a* faces the top surface 26*b* of the coil conductor 25*b*. The coil unit 1*a* may be disposed on the coil unit 1*b* such that the bottom cover layer 19*a* thereof is in contact with the top cover layer 18*b* of the coil unit 1*b*. The coil unit 1*a* may be disposed on the coil unit 1*b* such that the coil axis of the coil conductor 25*a* is aligned with the coil axis of the coil conductor 25*b*. In the embodiment shown, the coil axis A of the coil conductor 25*a* is aligned with the coil axis of the coil conductor 25*b*.

The coil component 1 includes a first coil (the coil conductor 25*a*) and a second coil (the coil conductor 25*b*), the first coil positioned between the external electrode 21 and the external electrode 22, the second coil positioned between the external electrode 23 and the external electrode 24. These two coils are connected to, for example, two signal lines in a differential transmission circuit, respectively. Thus, the coil component 1 can operate as a common mode choke coil.

The coil component 1 may include a third coil (not shown), in addition to the coil conductor 25*a* and the coil conductor 25*b*. The coil component 1 having the third coil additionally includes another coil unit configured in the same manner as the coil unit 1*a*. As with the coil unit 1*a* and the coil unit 1*b*, the additional coil unit includes a coil conductor that is connected to additional external electrodes. The coil component including three coils is used as, for example, a common mode choke coil for a differential transmission circuit having three signal lines.

In the coil component 1, the insulator body 11*a* contains filler particles 29*a* at least partially having electrical conductivity, and therefore, the insulator body 11*a* has a higher magnetic permeability than a conventional insulator body formed of ferrite. Likewise, the insulator body 11*b* contains filler particles 29*b* at least partially having electrical conductivity, and therefore, the insulator body 11*b* has a higher magnetic permeability than a conventional insulator body formed of ferrite. The increased magnetic permeability increases the coupling coefficient between the coil conductor 25*a* in the insulator body 11*a* and the coil conductor 25*b* in the insulator body 11*b*.

Next, a description is given of an example of a production method of the coil component 1. The coil component 1 can be produced by, for example, a lamination process. The first step is to produce the insulating layers 20*a*1 to 20*a*7, the insulating layers constituting the top cover layer 18*a*, and the insulating layers constituting the bottom cover layer 19*a*.

These insulating layers are produced through the following steps for example. First, filler particles at least a part of which has electrical conductivity are dispersed in a thermosetting resin (e.g., an epoxy resin), and the thermosetting resin is mixed with a solvent to produce a slurry. The slurry is applied to a surface of a base film made of a plastic and then dried, and the dried slurry is cut to a predetermined size to produce magnetic sheets to be used as the insulating layers 20*a*1 to 20*a*7, the insulating layers constituting the top cover layer 18*a*, and the insulating layers constituting the bottom cover layer 19*a*.

Next, through-holes are formed at predetermined positions in the magnetic sheets to be used as the insulating layers 20*a*1 to 20*a*7, so as to extend through the magnetic sheets in the direction of the axis T.

Next, each of the magnetic sheets is provided with a conductive pattern and a via. For example, a conductive paste made of a metal material (e.g. Ag) is applied by screen printing to the top surfaces of the magnetic sheets to be used as the insulating layers 20*a*1 to 20*a*7, thereby to form the conductive patterns 25*a*1 to 25*a*7 and the lead-out conductors 25*c*1, 25*c*2, and the metal paste is filled into the through-holes formed in the magnetic sheets to from the vias Va1 to Va6.

Next, the magnetic sheets to be used as the insulating layers 20*a*1 to 20*a*7 are stacked together to form a coil laminate to be used as the coil layer 20*a*. The magnetic sheets to be used as the insulating layers 20*a*1 to 20*a*7 are stacked together such that the conductive patterns 25*a*1 to 25*a*7 formed on the magnetic sheets are each electrically connected to adjacent conductive patterns through the vias Va1 to Va6.

Next, the magnetic sheets for forming the top cover layer 18*a* are stacked together to form a top cover layer laminate that corresponds to the top cover layer 18*a*, and the magnetic sheets for forming the bottom cover layer 19*a* are stacked together to form a bottom cover layer laminate that corresponds to the bottom cover layer 19*a*.

The same steps as above are performed to form a coil laminate to be used as the coil layer 20*b*, a top cover layer laminate corresponding to the top cover layer 18*b*, and the bottom cover layer laminate corresponding to the bottom cover layer 19*b*.

Next, the bottom cover layer laminate to be used as the bottom cover layer 19*b*, the coil laminate to be used as the coil layer 20*b*, the top cover layer laminate to be used as the top cover layer 18*b*, the bottom cover layer laminate to be used as the bottom cover layer 19*a*, the coil laminate to be used as the coil layer 20*a*, and the top cover layer laminate to be used as the top cover layer 18*a* are stacked together in this order and bonded together by thermal compression using a pressing machine to obtain a preliminary laminate.

Next, the preliminary laminate is segmented to a desired size by using a cutter such as a dicing machine or a laser processing machine to obtain a chip laminate corresponding to the insulator body 11*a*. Next, the chip laminate is degreased and then heated.

Next, a conductive paste is applied to both end portions of the heated chip laminate to form the external electrode 21, the external electrode 22, the external electrode 23, and the external electrode 24. Thus, the coil component 1 is obtained.

Since the insulator body 11*a* contains the filler particles 29*a* at least partially having electrical conductivity, it is necessary to ensure the insulation between the coil conductor 25*a* and other conductors, that is, the coil conductor 25*b* and the external electrodes 21 to 24. Likewise, since the insulator body 11*b* contains the filler particles 29*b* at least partially having electrical conductivity, it is necessary to ensure the insulation between the coil conductor 25*b* and other conductors, that is, the coil conductor 25*a* and the external electrodes 21 to 24. The coil conductor 25*a* and the coil conductor 25*b* are configured and arranged so as to ensure insulation from other conductors. A further description will be given of the configuration and arrangement of the coil conductor 25*a* and the coil conductor 25*b* for ensuring the insulation, with reference to FIGS. 5 and 6.

As shown in these drawings, the coil conductor 25*a* is formed such that the intervals between adjacent turns are g1. In the embodiment shown, the interval between the bottom surface of the conductive pattern 25*a*1 and the top surface of the conductive pattern 25*a*2 corresponds to the interval between the conductive pattern in the first turn and the conductive pattern in the second turn, both numbered from the external electrode 22. Therefore, the interval between the bottom surface of the conductive pattern 25*a*1 and the top surface of the conductive pattern 25*a*2 is g1. In one embodiment, all of the interval between the bottom surface of the conductive pattern 25*a*2 and the top surface of the conductive pattern 25*a*3, the interval between the bottom surface of the conductive pattern 25*a*3 and the top surface of the conductive pattern 25*a*4, the interval between the bottom surface of the conductive pattern 25*a*4 and the top surface of the conductive pattern 25*a*5, the interval between the bottom surface of the conductive pattern 25*a*5 and the top surface of the conductive pattern 25*a*6, and the interval between the bottom surface of the conductive pattern 25*a*6 and the top surface of the conductive pattern 25*a*7 are g1.

Likewise, in the embodiment shown, the coil conductor 25*b* is formed such that the intervals between adjacent turns are g2. In the embodiment shown, the interval between the bottom surface of the conductive pattern 25*b*1 and the top surface of the conductive pattern 25*b*2 corresponds to the interval between the conductive pattern in the first turn and the conductive pattern in the second turn, both numbered from the external electrode 24. Therefore, the interval between the bottom surface of the conductive pattern 25*b*1 and the top surface of the conductive pattern 25*b*2 is g2. In one embodiment, all of the interval between the bottom surface of the conductive pattern 25*b*2 and the top surface of the conductive pattern 25*b*3, the interval between the bottom surface of the conductive pattern 25*b*3 and the top surface of the conductive pattern 25*b*4, the interval between the bottom surface of the conductive pattern 25*b*4 and the top surface of the conductive pattern 25*b*5, the interval between the bottom surface of the conductive pattern 25*b*5 and the top surface of the conductive pattern 25*b*6, and the interval between the bottom surface of the conductive pattern 25*b*6 and the top surface of the conductive pattern 25*b*7 are g2. The value of g2 is either the same as or different from the value of g1.

As described above, the insulator body 11*a* has a volume resistivity ρ1, and the coil conductor 25*a* contained in the insulator body 11*a* is wound around the coil axis A for N1 turns. As described above, the volume resistivity ρ1 has such a value that no dielectric breakdown occurs between adjacent turns of the coil conductor 25*a*. In the above embodiment, the intervals between adjacent turns of the coil conductor 25*a* are g1, and therefore, when a conductor in the insulator body 11*a* is distant from the coil conductor 25*a* by g1 or more, no dielectric breakdown occurs between this conductor and the coil conductor 25*a* during use of the coil component 1. When a voltage V1 is applied across the coil conductor 25*a*, a voltage of V1/N1 is applied between adjacent turns of the coil conductor 25*a*. Therefore, the insulator body 11*a* is configured such that no dielectric breakdown occurs when a voltage of V1/N1 is applied between adjacent turns of the coil conductor 25*a*. That is, the withstanding voltage for an interval of g1 in the insulator body 11*a* is V1/N1 or higher. Accordingly, when a conductor is disposed in the insulator body 11*a* at a position distant from the coil conductor 25*a* by g1×N1 or more, no dielectric breakdown occurs between this conductor and the coil conductor 25*a* even if the potential difference between this conductor and the coil conductor 25*a* is V1. In other words, in the insulator body 11*a*, insulation is ensured between the coil conductor 25*a* and a conductor disposed so as to be distant from the coil conductor 25*a* by g1×N1 or more.

As described above, the insulator body 11*b* has a volume resistivity ρ2, and the coil conductor 25*b* contained in the insulator body 11*b* is wound around the coil axis A for N2 turns. As described above, the volume resistivity ρ2 has such a value that no dielectric breakdown occurs between adjacent turns of the coil conductor 25*b*. In the above embodiment, the intervals between adjacent turns of the coil conductor 25*b* are g2, and therefore, when a conductor in the insulator body 11*b* is distant from the coil conductor 25*b* by g2 or more, no dielectric breakdown occurs between this conductor and the coil conductor 25*b* during use of the coil component 1. When a voltage V2 is applied across the coil conductor 25*b*, a voltage of V2/N2 is applied between adjacent turns of the coil conductor 25b. Therefore, the insulator body 11b is configured such that no dielectric breakdown occurs when a voltage of V2/N2 is applied between adjacent turns of the coil conductor 25b. That is, the withstanding voltage for an interval of g2 in the insulator body 11b is V2/N2 or higher. Accordingly, when a conductor is disposed in the insulator body 11b at a position distant from the coil conductor 25b by g2×N2 or more, no dielectric breakdown occurs between this conductor and the coil conductor 25b even if the potential difference between this conductor and the coil conductor 25b is V2. In other words, in the insulator body 11b, insulation is ensured between the coil conductor 25b and a conductor disposed so as to be distant from the coil conductor 25b by g2×N2 or more.

As described above, in the insulator body 11a, insulation is ensured between the coil conductor 25a and a conductor disposed so as to be distant from the coil conductor 25a by g1×N1 or more, and in the insulator body 11b, insulation is ensured between the coil conductor 25b and a conductor disposed so as to be distant from the coil conductor 25b by g2×N2 or more. Therefore, insulation between the coil conductor 25a and the coil conductor 25b can be ensured by arranging the coil conductor 25a and the coil conductor 25b so as to be distant from each other by g1×N1+g2×N2. When the bottom surface 27a of the coil conductor 25a faces the top surface 26b of the coil conductor 25b, insulation between the coil conductor 25a and the coil conductor 25b can be ensured with the distance T between the bottom surface 27a and the top surface 26b satisfying the relationship T≥g1×N1+g2×N2.

In one embodiment of the present invention, the coil conductor 25a and the external electrode 21 are formed and arranged such that the distance M1 between the coil conductor 25a and the external electrode 21 satisfies the relationship M1 g1×N1. Thus, insulation between the coil conductor 25a and the external electrode 21 can be ensured. The distance M1 between the coil conductor 25a and the external electrode 21 herein refers to the distance between the external electrode 21 and a portion of the coil conductor 25a wound around the coil axis A, the portion being the closest to the external electrode 21.

In one embodiment of the present invention, the coil conductor 25a and the external electrode 22 are formed and arranged such that the distance M2 between the coil conductor 25a and the external electrode 22 satisfies the relationship M2 g1×N1. Thus, insulation between the coil conductor 25a and the external electrode 22 can be ensured. The distance M2 between the coil conductor 25a and the external electrode 22 herein refers to the distance between the external electrode 22 and a portion of the coil conductor 25a wound around the coil axis A, the portion being the closest to the external electrode 22.

In one embodiment of the present invention, the coil conductor 25b and the external electrode 23 are formed and arranged such that the distance M3 between the coil conductor 25b and the external electrode 23 satisfies the relationship M3 g2×N2. Thus, insulation between the coil conductor 25b and the external electrode 23 can be ensured. The distance M3 between the coil conductor 25b and the external electrode 23 herein refers to the distance between the external electrode 23 and a portion of the coil conductor 25b wound around the coil axis A, the portion being the closest to the external electrode 23.

In one embodiment of the present invention, the coil conductor 25b and the external electrode 24 are formed and arranged such that the distance M4 between the coil conductor 25b and the external electrode 24 satisfies the relationship M4 g2×N2. Thus, insulation between the coil conductor 25b and the external electrode 24 can be ensured. The distance M4 between the coil conductor 25b and the external electrode 24 herein refers to the distance between the external electrode 24 and a portion of the coil conductor 25b wound around the coil axis A, the portion being the closest to the external electrode 24.

In one embodiment of the present invention, the coil conductor 25a and the coil conductor 25b are provided such that the distance T between the bottom surface 27a of the coil conductor 25a and the top surface 26b of the coil conductor 25b satisfies the relationship 2×(g1×N1+g2×N2) ≥T≥g1×N1+g2×N2.

A large distance between the coil conductor 25a and the coil conductor 25b ensures the insulation but also degrades the coupling coefficient between these coil conductors. When the upper limit of the distance T between the bottom surface 27a of the coil conductor 25a and the top surface 26b of the coil conductor 25b is 2×(g1×N1+g2×N2), the coupling coefficient can be inhibited from being degraded. Further, when the upper limit of the distance T is 2×(g1×N1+g2×N2), the coil component 1 can have a low profile.

The coil component 1, which is formed by the lamination process, is more susceptible to downsizing than conventional assembled coupled inductors.

Next, with reference to FIGS. 7 to 12, a description is given of a coil component 101 according to another embodiment of the present invention. The coil component 101 shown in FIG. 7 has external electrodes arranged differently than in the coil component 1. The coil component 101 will be hereinafter described. Among the elements of the coil component 101, elements the same as or similar to those of the coil component 1 will not be described again.

Figure 7:
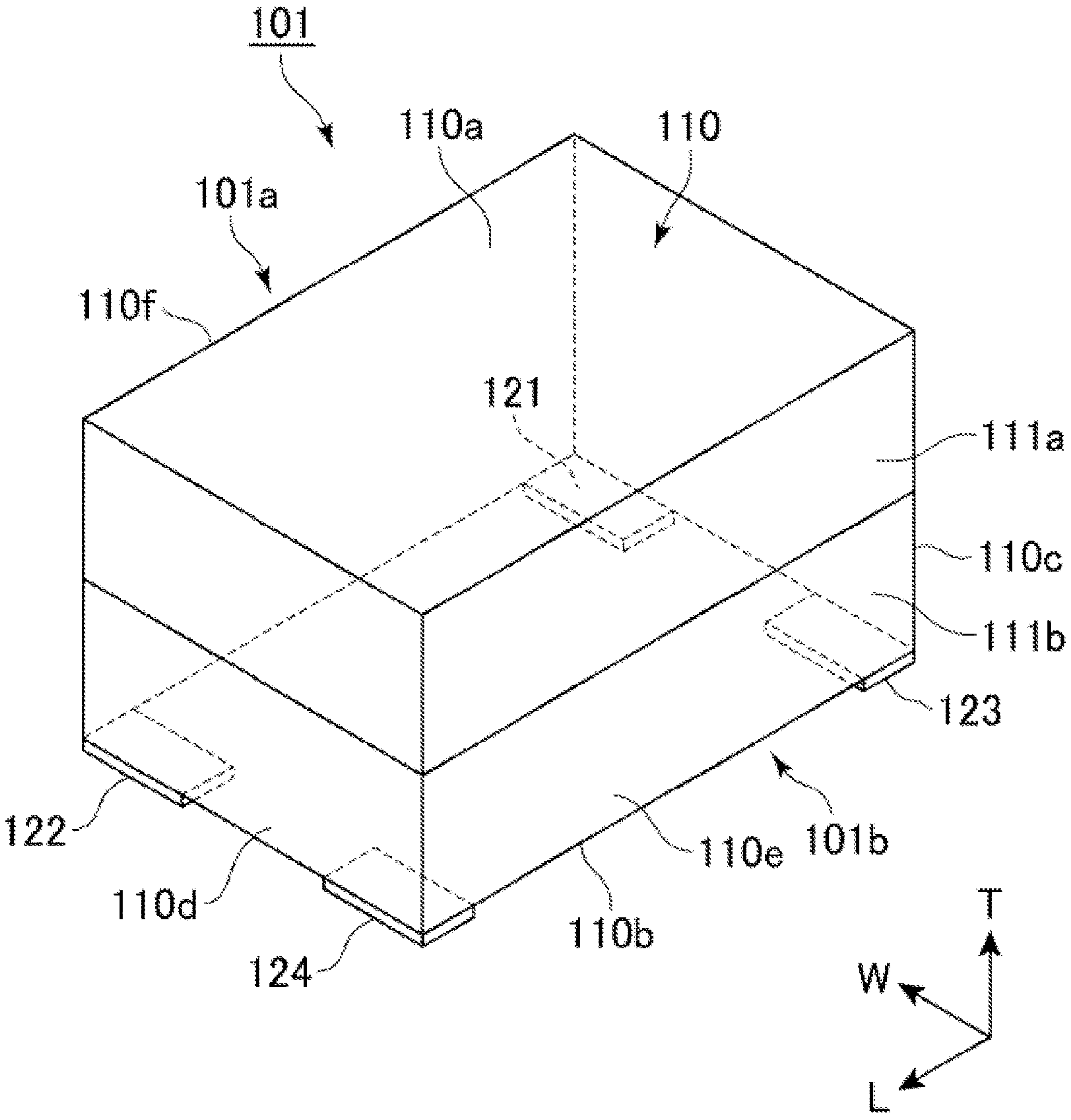
FIG. 7 is a perspective view of a coil component according to another embodiment of the present invention.
Figure 8:
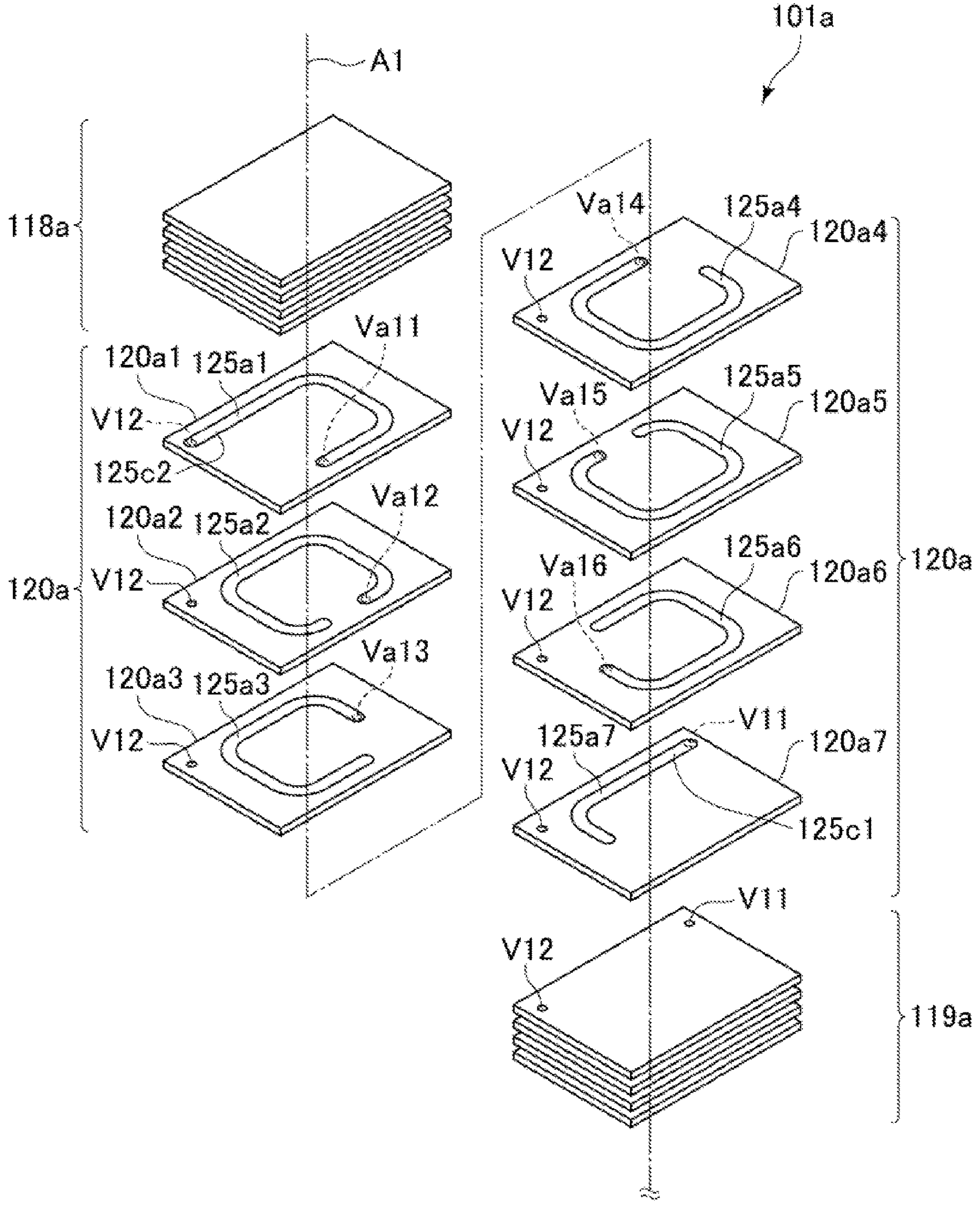
FIG. 8 is an exploded perspective view of one of two coil units included in the coil component of FIG. 7.
Figure 9:
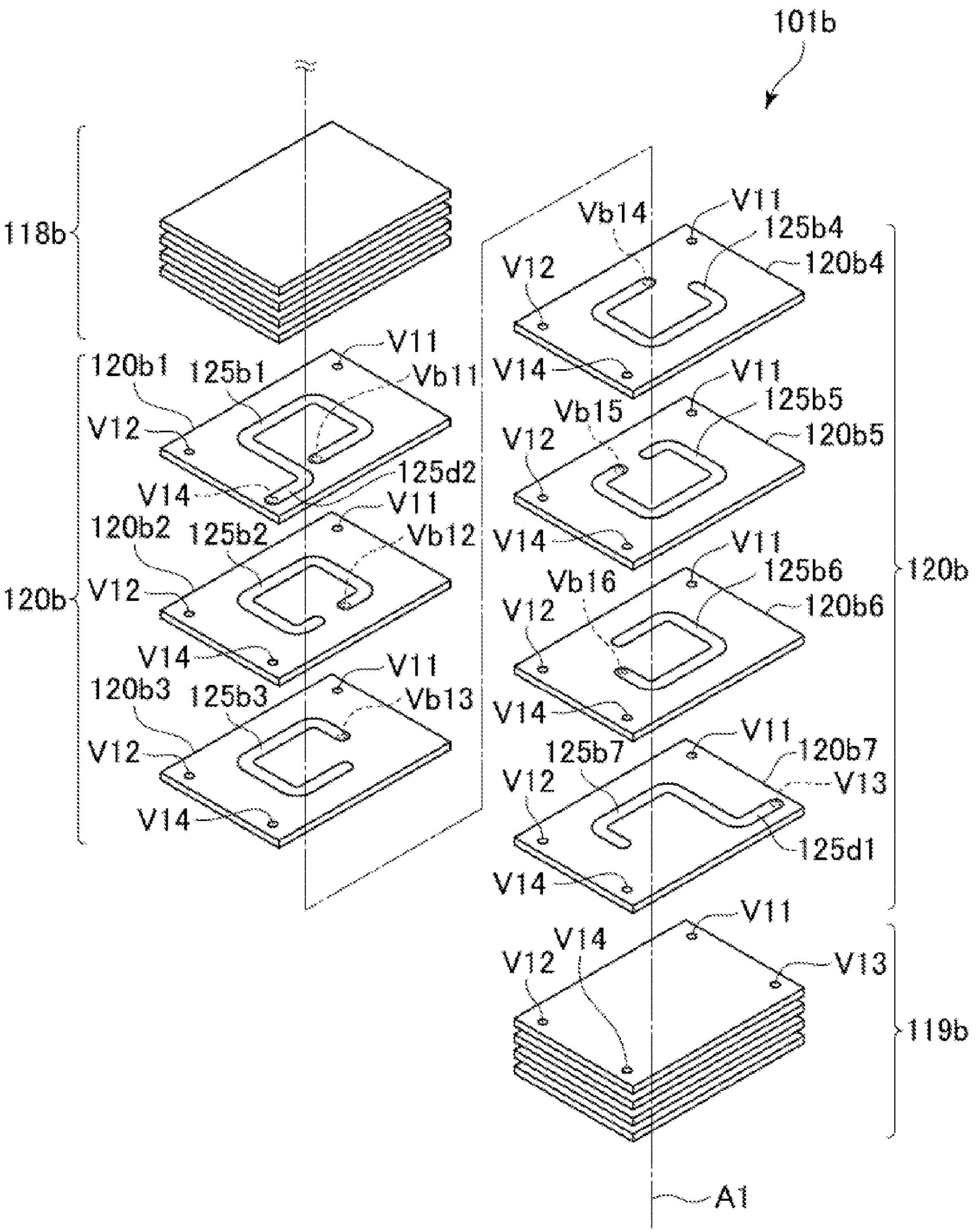
FIG. 9 is an exploded perspective view of the other of the two coil units included in the coil component of FIG. 7.
Figure 10:
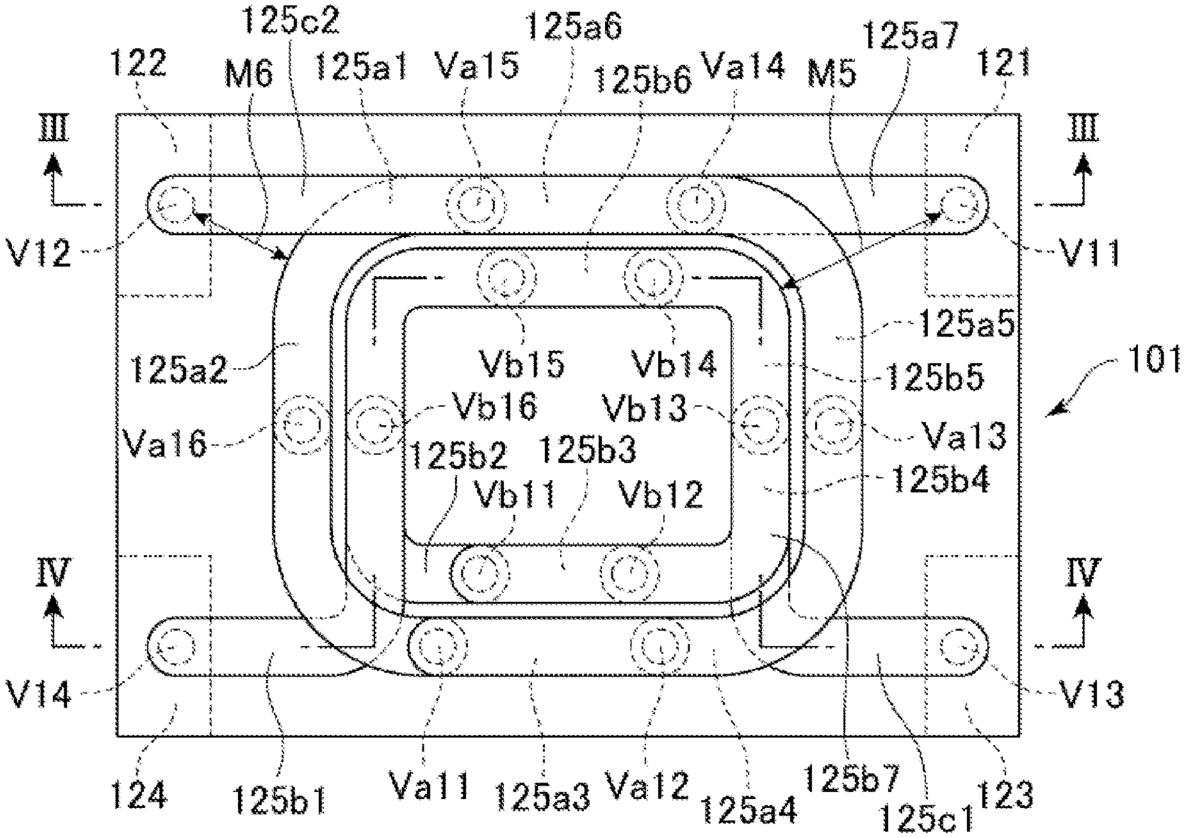
FIG. 10 is a plan view of the coil component shown in FIG. 7.
Figure 11:
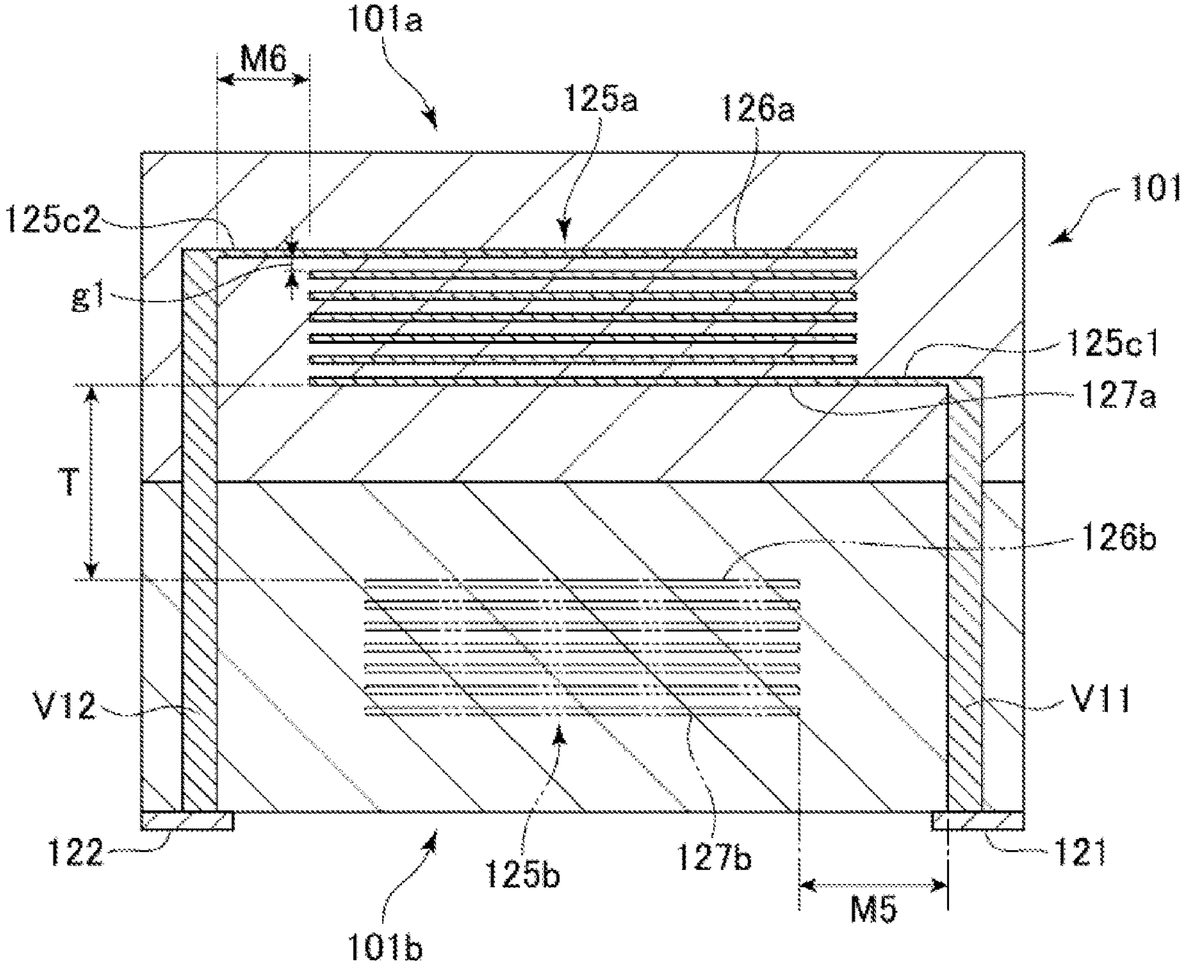
FIG. 11 schematically shows a cross section of the coil component of FIG. 7 cut along the line III-III.
Figure 12:
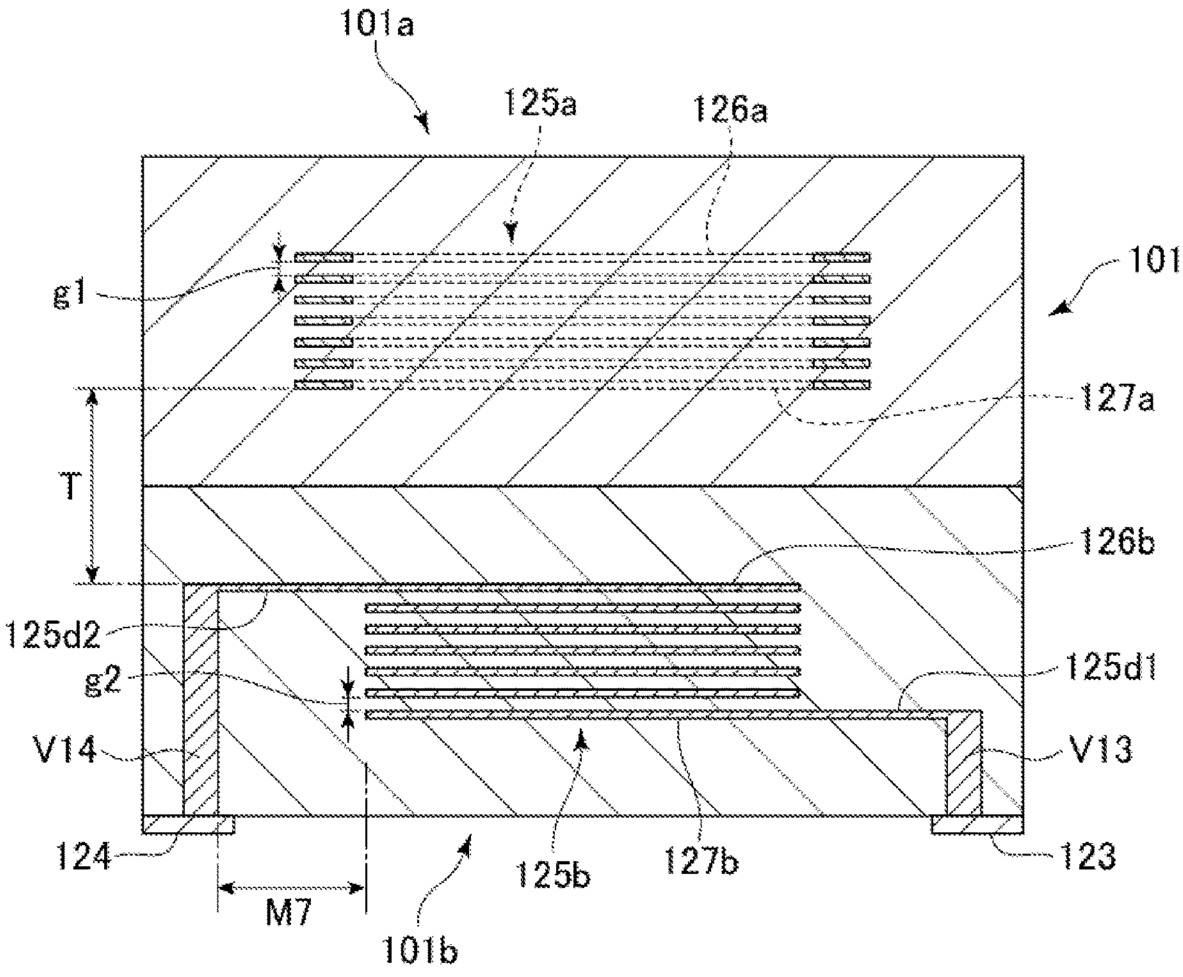
FIG. 12 schematically shows a cross section of the coil component of FIG. 7 cut along the line IV-IV.

FIG. 7 is a perspective view of the coil component 101 according to one embodiment of the present invention, FIG. 8 is an exploded perspective view of a coil unit 101a included in the coil component 101 of FIG. 7, FIG. 9 is an exploded perspective view of a coil unit 101b included in the coil component 101 of FIG. 7, FIG. 10 is a plan view of the coil component 101 of FIG. 7, FIG. 11 schematically shows a cross section of the coil component 101 cut along the line III-III, and FIG. 12 schematically shows a cross section of the coil component 101 cut along the line IV-IV. In FIG. 10, a top cover layer 118a (described later) is omitted for description of the winding pattern of the coil conductors.

As shown, the coil component 101 includes a coil unit 101a, a coil unit 101b, an external electrode 121, an external electrode 122, an external electrode 123, and an external electrode 124.

The coil unit 101a includes an insulator body 111a, made of a magnetic material having an excellent insulating quality, and a coil conductor 125a provided in the insulator body 111a. In one embodiment, the insulator body 111a has a rectangular parallelepiped shape. One end of the coil conductor 125a is electrically connected to the external electrode 121. The other end of the coil conductor 125a is electrically connected to the external electrode 122.

The coil unit 101b may be configured in the same manner as the coil unit 101a. In the embodiment shown, the coil unit 101b includes an insulator body 111b, made of a magnetic material, and a coil conductor 125b provided in the insulator body 111b. In one embodiment, the insulator body 111b has a rectangular parallelepiped shape. One end of the coil conductor 125b is electrically connected to the external electrode 123. The other end of the coil conductor 125b is electrically connected to the external electrode 124. The coil conductor 125a and the coil conductor 125b may have the same shape or may have different shapes. In the embodiment shown, the shape of the coil conductor 125*a* is different from that of the coil conductor 125*b*. When the coil conductor 125*a* and the coil conductor 125*b* have different shapes, the inductance of the coil conductor 125*a* may be different from that of the coil conductor 125*b*.

The bottom surface of the insulator body 111*a* is joined to the top surface of the insulator body 111*b*. An insulator body 110 (also referred to as "the base 110" or "the insulating base 110") includes the insulator body 111*a* and the insulator body 111*b* joined to the insulator body 111*a*.

The insulator body 110 has a first principal surface 110*a*, a second principal surface 110*b*, a first end surface 110*c*, a second end surface 110*d*, a first side surface 110*e*, and a second side surface 110*f*. The outer surface of the insulator body 110 is defined by these six surfaces. The first principal surface 110*a* and the second principal surface 110*b* are opposed to each other, the first end surface 110*c* and the second end surface 110*d* are opposed to each other, and the first side surface 110*e* and the second side surface 110*f* are opposed to each other.

In FIG. 7, the first principal surface 110*a* lies on the top side of the insulator body 110, and therefore, the first principal surface 110*a* may be herein referred to as "the top surface." Similarly, the second principal surface 110*b* may be referred to as "the bottom surface." The coil component 101 is disposed such that the second principal surface 110*b* faces a circuit board (not shown), and therefore, the second principal surface 110*b* may be herein referred to as "the mounting surface." Furthermore, the top-bottom direction of the coil component 101 is based on the top-bottom direction in FIG. 7.

The coil component 101 may have about the same length (the dimension in the direction of the axis L), width (the dimension in the direction of the axis W), and thickness (the dimension in the direction of the axis T) as the coil component 1.

As shown, the external electrodes 121 to 124 are provided on the bottom surface 110*b* (the mounting surface) of the insulator body 110. Since the external electrodes 121 to 124 are provided on the mounting surface of the insulator body 110, the coil component 101 can have a reduced size in the direction of the axis L and the direction of the axis W. Thus, the area on a circuit board occupied by the coil component 101 can be reduced. Each of the external electrodes 121 to 124 may be formed such that a part thereof extends along at least one of the first end surface 110*c*, the second end surface 110*d*, the first side surface 110*e*, and the second side surface 110*f*. The shapes and the arrangements of the external electrodes 121 to 124 described explicitly in this specification are mere examples. Therefore, the shapes and the arrangements of the external electrodes that are applicable to the present invention are not limited to those explicitly described in this specification.

As shown in FIG. 8, the insulator body 111*a* includes a coil layer 120*a*, a top cover layer 118*a* provided on the top surface of the coil layer 120*a*, and a bottom cover layer 119*a* provided on the bottom surface of the coil layer 120*a*.

The coil layer 120*a* includes insulating layers 120*a*1 to 120*a*7 stacked together. The insulator body 111*a* includes an insulating layer 120*a*7, an insulating layer 120*a*6, an insulating layer 120*a*5, an insulating layer 120*a*4, an insulating layer 120*a*3, an insulating layer 120*a*2, and an insulating layer 120*a*1 that are stacked in this order from the negative side to the positive side in the direction of the axis T.

The coil conductor 125*a* has a top surface 126*a* and a bottom surface 127*a*. The top surface 126*a* is a plain surface extending through the top surface of the conductive pattern 125*a*1. The bottom surface 127*a* is a plain surface extending through the bottom surface of the conductive pattern 125*a*7.

In still another embodiment of the present invention, the insulating layers 120*a*1 to 120*a*7 may be stacked together in the direction of the axis L or may be stacked together in the direction of the axis W.

The conductive pattern 125*a*1 is wound around the coil axis A1 for a three-fourth turn. Each of the conductive patterns 125*a*2 to 125*a*6 is wound around the coil axis A1 for a seven-eighth turn. The conductive pattern 125*a*7 is wound around the coil axis A1 for a one-fourth turn. The conductive pattern 125*a*1 is wound for a smaller number of turns than the conductive patterns 125*a*2 to 125*a*6 because it is connected with the external electrode 122. The conductive pattern 125*a*7 is wound for a smaller number of turns than the conductive patterns 125*a*2 to 125*a*6 because it is connected with the external electrode 121. The numbers of turns of the conductive patterns 125*a*1 to 125*a*7 are not limited to those described herein as examples. In the embodiment shown, the coil conductor 125*a* is wound around the coil axis A1 for 5.375 ($=3/4+5\times7/8+1/4$) turns. The number of turns of the coil conductor 125*a* is not limited to that described herein as an example. The coil conductor 125*a* is wound around the coil axis A1 for N1 turns (N1 is a real number equal to or greater than two).

The top cover layer 118*a* is a laminate including a plurality of insulating layers stacked together. Similarly, the bottom cover layer 119*a* is a laminate including a plurality of insulating layers stacked together.

The coil layer 120*a* may include any number of insulating layers as necessary, in addition to the insulating layers 120*a*1 to 120*a*7. A part of the insulating layers 120*a*1 to 120*a*7 may be omitted as necessary.

The top cover layer 118*a*, the bottom cover layer 119*a*, and the coil layer 120*a* are made of the same materials as the top cover layer 18*a*, the bottom cover layer 19*a*, and the coil layer 20*a*, respectively. The top cover layer 118*a*, the bottom cover layer 119*a*, and the coil layer 120*a* contain a large number of filler particles 29*a* at least partially having electrical conductivity. A part of the insulating layers constituting the top cover layer 118*a*, the bottom cover layer 119*a*, and the coil layer 120*a* may not contain the filler particles 29*a*.

The volume resistivity of the insulator body 111*a* has such a value that no dielectric breakdown occurs between adjacent turns of the coil conductor 125*a*. The volume resistivity of the insulator body 111*a* may be the same as the volume resistivity ρ1 of the insulator body 11*a*.

On the top surfaces of the insulating layers 120*a*1 to 120*a*7, there are provided conductive patterns 125*a*1 to 125*a*7, respectively. The conductive patterns 125*a*1 to 125*a*7 may be formed of the same material by the same method as the conductive patterns 25*a*1 to 25*a*7.

The insulating layers 120*a*1 to 120*a*6 are provided with vias Va11 to Va16, respectively, at predetermined positions therein. The vias Va11 to Va16 are formed by drilling through-holes at predetermined positions in the insulating layers 120*a*1 to 120*a*6 so as to extend through the insulating layers 120*a*1 to 120*a*6 in the direction of the axis T and filling the conductive paste into the through-holes.

Each of the conductive patterns 125*a*1 to 125*a*7 is electrically connected to adjacent ones via the vias Va11 to Va16. For example, the conductive pattern 125*a*1 is electrically connected to the conductive pattern 125*a*2, adjacent to the conductive pattern 125*a*1, via the via Va11. The conductive patterns 125*a*1 to 125*a*7 connected in this manner constitute a coil conductor 125*a* having a spiral shape. The coil conductor 125*a* includes the conductive patterns 125*a*1 to 125*a*7 and the vias Va11 to Va16. As with the coil conductor 25*a*, the coil conductor 125*a* is formed such that the intervals between adjacent turns are g1.

Next, the coil unit 101*b* will be described. The coil unit 101*b* is shown in most detail in FIG. 9. The coil unit 101*b* may be configured in the same manner as the coil unit 101*a*.

The coil unit 101*b* includes the insulator body 111*b*. The insulator body 111*b* includes a coil layer 120*b*, a top cover layer 118*b* provided on the top surface of the coil layer 120*b*, and a bottom cover layer 119*b* provided on the bottom surface of the coil layer 120*b*. The coil layer 120*b* is configured in the same manner as the coil layer 120*a*. More specifically, the coil layer 120*b* includes insulating layers 120*b*1 to 120*b*7 stacked together. The insulating layers 120*b*1 to 120*b*7 are configured in the same manner as the insulting layers 120*a*1 to 120*a*7.

The bottom cover layer 119*b* is configured in the same manner as the top cover layer 118*a*. More specifically, the bottom cover layer 119*b* is a laminate including a plurality of insulating layers stacked together. The top cover layer 118*b* is configured in the same manner as the bottom cover layer 119*a*. More specifically, the top cover layer 118*b* is a laminate including a plurality of insulating layers stacked together.

The insulating layers constituting the top cover layer 118*b*, the bottom cover layer 119*b*, and the coil layer 120*b* are formed of a resin material having an excellent insulating quality, as are the insulating layers constituting the top cover layer 118*a*, the bottom cover layer 119*a*, and the coil layer 120*a*. At least a part of the insulating layers constituting the top cover layer 118*b*, the bottom cover layer 119*b*, and the coil layer 120*b* contains a large number of filler particles 29*b* at least partially having electrical conductivity.

The volume resistivity of the insulator body 111*b* has such a value that no dielectric breakdown occurs between adjacent turns of the coil conductor 125*b*. The volume resistivity of the insulator body 111*b* may be the same as the volume resistivity ρ2 of the insulator body 11*b*.

In the embodiment shown, the coil conductor 125*b* includes conductive patterns 125*b*1 to 125*b*7. Each of the conductive patterns 125*b*1 to 125*b*7 is formed on the top surface of the corresponding one of the insulating layers 120*b*1 to 120*b*7. Each of the conductive patterns 125*b*1 to 125*b*7 is electrically connected to adjacent ones via the vias Vb11 to Vb16. For example, the conductive pattern 125*b*1 is connected to the conductive pattern 125*b*2 via the via Vb11.

The coil conductor 125*b* has a top surface 126*b* and a bottom surface 127*b*. The top surface 126*b* is a plain surface extending through the top surface of the conductive pattern 125*b*1. The bottom surface 127*b* is a plain surface extending through the bottom surface of the conductive pattern 125*b*7.

Each of the conductive patterns 125*b*1 to 125*b*6 is wound around the coil axis A1 for a seven-eighth turn. The conductive pattern 125*b*7 is wound for a smaller number of turns than the other conductive patterns because it is connected with the external electrode 123. In the embodiment shown, the conductive pattern 125*b*7 is wound around the coil axis A1 for a half turn. The numbers of turns of the conductive patterns 125*b*1 to 125*b*7 are not limited to those described herein as examples. Therefore, in the embodiment shown, the coil conductor 125*b* is wound around the coil axis A1 for 5.75 turns. The number of turns of the coil conductor 125*b* is not limited to that described herein as an example. The coil conductor 125*b* is wound around the coil axis A1 for N2 turns (N2 is a real number equal to or greater than two).

The coil conductor 125*a* and the coil conductor 125*b* are connected to corresponding external electrodes via the via conductors. As clearly shown in FIGS. 11 and 12, the coil component 101 includes a via V11 extending from the external electrode 121 in the positive direction of the axis T, a via V12 extending from the external electrode 122 in the positive direction of the axis T, a via V13 extending from the external electrode 123 in the positive direction of the axis T, and a via V14 extending from the external electrode 124 in the positive direction of the axis T.

The end of the conductive pattern 125*a*1 opposite to the other end connected to the via Va11 is connected to the via V12 via the lead-out conductor 125*c*2. The end of the conductive pattern 125*a*7 opposite to the other end connected to the via Va16 is connected to the via V11 via the lead-out conductor 125*c*1. The lead-out conductor 125*c*1 is formed on the top surface of the insulating layer 120*a*7. The lead-out conductor 125*c*2 is formed on the top surface of the insulating layer 120*a*1. The lead-out conductor 125*c*1 and the lead-out conductor 125*c*2 may be formed of the same electrically conductive material as the conductive patterns 125*a*1 to 125*a*7. The conductive patterns 125*a*1 to 125*a*7 constitute the coil conductor 125*a*.

Thus, the coil conductor 125*a* is connected to the external electrode 121 via the lead-out conductor 125*c*1 and the via V11 and is connected to the external electrode 122 via the lead-out conductor 125*c*2 and the via V12.

The end of the conductive pattern 125*b*1 opposite to the other end connected to the via Vb11 is connected to the via V14 via the lead-out conductor 125*d*2. The end of the conductive pattern 125*b*7 opposite to the other end connected to the via Vb16 is connected to the via V13 via the lead-out conductor 125*d*1. The lead-out conductor 125*d*1 is formed on the top surface of the insulating layer 120*b*7. The lead-out conductor 125*d*2 is formed on the top surface of the insulating layer 120*b*1. The lead-out conductor 125*d*1 and the lead-out conductor 125*d*2 may be formed of the same electrically conductive material as the conductive patterns 125*b*1 to 125*b*7. The conductive patterns 125*b*1 to 125*b*7 constitute the coil conductor 125*b*. As with the coil conductor 25*b*, the coil conductor 125*b* is formed such that the intervals between adjacent turns are g2.

Thus, the coil conductor 125*b* is connected to the external electrode 123 via the lead-out conductor 125*d*1 and the via V13 and is connected to the external electrode 124 via the lead-out conductor 125*d*2 and the via V14.

The coil unit 101*a* is joined to the coil unit 101*b*. In one embodiment of the present invention, the coil unit 101*a* is disposed such that the bottom surface thereof is in contact with the top surface of the coil unit 101*b*. Therefore, in the embodiment shown, the bottom surface 127*a* of the coil conductor 125*a* faces the top surface 126*b* of the coil conductor 125*b*. The coil unit 101*a* may be disposed on the coil unit 101*b* such that the coil axis of the coil conductor 125*a* is aligned with the coil axis of the coil conductor 125*b*. In the embodiment shown, the coil axis A1 of the coil conductor 125*a* is aligned with the coil axis A1 of the coil conductor 125*b*.

The coil component 101 may be produced by the same production method as the coil component 1. The coil component 101 can be produced by, for example, a lamination process.

Since the insulator body 101*a* contains the filler particles 29*a* at least partially having electrical conductivity, it is necessary to ensure the insulation between the coil conductor 125*a* and the vias V11 to V14. Since the insulator body 101*b* contains the filler particles 29*b* at least partially having electrical conductivity, it is necessary to ensure the insulation between the coil conductor 125*b* and the vias V11 to V14. The coil conductor 125*a* and the coil conductor 125*b* are configured and arranged so as to ensure the insulation. A further description will be given of the configuration and arrangement of the coil conductor 125*a* and the coil conductor 125*b* for ensuring the insulation, with reference to FIGS. 11 and 12.

As described above, in one embodiment, the insulator body 110*a* has a volume resistivity ρ1, and the coil conductor 125*a* contained in the insulator body 110*a* is wound around the coil axis A1 for N1 turns. Therefore, in the insulator body 110*a*, insulation can be ensured between the coil conductor 125*a* and a conductor disposed so as to be distant from the coil conductor 125*a* by g1×N1 or more. The insulator body 110*b* has a volume resistivity ρ2, and the coil conductor 125*b* contained in the insulator body 110*b* is wound around the coil axis A1 for N2 turns. Therefore, in the insulator body 110*b*, insulation can be ensured between the coil conductor 125*b* and a conductor disposed so as to be distant from the coil conductor 125*b* by g2×N2 or more. In one embodiment of the present invention, the coil conductor 125*b* and the via V11 are formed and arranged such that the distance M5 between the coil conductor 125*b* and the via V11 satisfies the relationship M5≥g1×N1+g2×N2. Thus, insulation between the coil conductor 125*b* and the via V11 can be ensured. The distance M5 between the coil conductor 125*b* and the via V11 herein refers to the distance between the via V11 and a portion of the coil conductor 125*b* wound around the coil axis A1, the portion being the closest to the via V11.

In one embodiment of the present invention, the coil conductor 125*a* and the via V12 are formed and arranged such that the distance M6 between the coil conductor 125*a* and the via V12 satisfies the relationship M6≥g1×N1. Thus, insulation between the coil conductor 125*a* and the via V12 can be ensured. The distance M6 between the coil conductor 125*a* and the via V12 herein refers to the distance between the via V12 and a portion of the coil conductor 125*a* wound around the coil axis A1, the portion being the closest to the via V12.

In one embodiment of the present invention, the coil conductor 125*b* and the via V14 are formed and arranged such that the distance M7 between the coil conductor 125*b* and the via V14 satisfies the relationship M7≥g2×N2. Thus, insulation between the coil conductor 125*b* and the via V14 can be ensured. The distance M7 between the coil conductor 125*b* and the via V14 herein refers to the distance between the via V14 and a portion of the coil conductor 125*b* wound around the coil axis A1, the portion being the closest to the via V14.

In one embodiment, the coil conductor 125*b* has a smaller outer diameter than the coil conductor 125*a* to ensure insulation. As most clearly shown in FIG. 10, in one embodiment, the outer diameter of the coil conductor 125*b* is smaller than the inner diameter of the coil conductor 125*a*.

The dimensions, materials, and arrangements of the various constituents described in this specification are not limited to those explicitly described for the embodiments, and the various constituents can be modified to have any dimensions, materials, and arrangements within the scope of the present invention. Constituents other than those explicitly described herein can be added to the described embodiments; and part of the constituents described for the embodiments can be omitted.

What is claimed is:

1. A coil component, comprising:

a first insulator body containing first magnetic metal particles, a second insulator body containing second magnetic metal particles, the second insulator body being in direct contact with the first insulator body;

a first coil conductor provided in the first insulator body, the first coil conductor wound around a coil axis for N1 turns such that two or more intervals between adjacent turns of the first coil conductor are arranged, each of the two or more intervals between the adjacent turns of the first coil conductor being g1; and a second coil conductor provided in the second insulator body, the second coil conductor wound around the coil axis for N2 turns such that two or more intervals between adjacent turns of the second coil conductor are arranged, each of the two or more intervals between the adjacent turns of the second coil conductor being g2;

wherein a first coil surface of the first coil conductor faces a second coil surface of the second coil conductor, wherein a distance T between the first coil surface and the second coil surface satisfies a relationship T≥g1×N1+g2×N2.

2. The coil component according to claim 1, wherein the first insulator body has a volume resistivity of $1\times10^7$ Ω·cm or lower.

3. The coil component according to claim 1, wherein the second insulator body has a volume resistivity of $1\times10^7$ Ω·cm or lower.

4. The coil component according to claim 1, further comprising:

a first external electrode electrically connected to one end of the first coil conductor; and a second external electrode electrically connected to another end of the first coil conductor, wherein a distance M1 between the first coil conductor and the first external electrode satisfies a relationship M1≥g1×N1, and wherein a distance M2 between the first coil conductor and the second external electrode satisfies a relationship M2≥g1×N1.

5. The coil component according to claim 4, wherein the first coil conductor is connected to the first external electrode via a first via conductor, and a distance M5 between the second coil conductor and the first via conductor satisfies a relationship M5≥g1×N1+g2×N2.

6. The coil component according to claim 4, wherein the first coil conductor is connected to the second external electrode via a second via conductor, and a distance M6 between the first coil conductor and the second via conductor satisfies a relationship M6≥g1×N1.

7. The coil component according to claim 4, further comprising:

a third external electrode electrically connected to one end of the second coil conductor; and a fourth external electrode electrically connected to another end of the second coil conductor, wherein a distance M3 between the second coil conductor and the third external electrode satisfies a relationship M3≥g2× N2, and wherein a distance M4 between the second coil conductor and the fourth external electrode satisfies a relationship M4≥g2× N2.

8. The coil component according to claim 7, wherein the second coil conductor is connected to the third external electrode via a third via conductor, and the second coil conductor is connected to the fourth external electrode via a fourth via conductor, and a distance M7 between the second coil conductor and the fourth via conductor satisfies a relationship M7≥g2× N2.

9. The coil component according to claim 1, wherein the distance T satisfies a relationship 2×(g1×N1+g2×N2) ≥T≥g1×N1+g2×N2.

10. The coil component according to claim 1, wherein the first coil conductor is magnetically coupled with the second coil conductor.

11. The coil component according to claim 1, further comprising:

a first external electrode electrically connected to one end of the first coil conductor;

a second external electrode electrically connected to another end of the first coil conductor;

a third external electrode electrically connected to one end of the second coil conductor;

a fourth external electrode electrically connected to another end of the second coil conductor;

a first via conductor electrically connecting between the first coil conductor and the first external electrode;

a second via conductor electrically connecting between the first coil conductor and the second external electrode;

a third via conductor electrically connecting between the second coil conductor and the third external electrode; and a fourth via conductor electrically connecting between the second coil conductor and the fourth external electrode, wherein a distance M5 between the second coil conductor and the first via conductor satisfies a relationship M5≥g1×N1+g2×N2, a distance M6 between the first coil conductor and the second via conductor satisfies a relationship M6≥g1× N1, and a distance M7 between the second coil conductor and the fourth via conductor satisfies a relationship M7≥g2× N2.

12. A coil component, comprising:

a first insulator body containing first magnetic metal particles, a second insulator body containing second magnetic metal particles, a first coil conductor provided in the first insulator body, the first coil conductor wound around a coil axis for N1 turns such that two or more intervals between adjacent turns of the first coil conductor are arranged, each of the two or more intervals between the adjacent turns of the first coil conductor being g1;

a second coil conductor provided in the second insulator body, the second coil conductor wound around the coil axis for N2 turns such that two or more intervals between adjacent turns of the second coil conductor are arranged, each of the two or more intervals between the adjacent turns of the second coil conductor being g2;

a first external electrode electrically connected to one end of the first coil conductor;

a second external electrode electrically connected to another end of the first coil conductor;

a third external electrode electrically connected to one end of the second coil conductor; and a fourth external electrode electrically connected to another end of the second coil conductor, wherein a distance M1 between the first coil conductor and the first external electrode satisfies a relationship M1≥g1×N1, a distance M2 between the first coil conductor and the second external electrode satisfies a relationship M2≥g1×N1, a distance M3 between the second coil conductor and the third external electrode satisfies a relationship M3≥g2× N2, and a distance M4 between the second coil conductor and the fourth external electrode satisfies a relationship M4≥g2× N2.

* * * * *